US011256867B2

(12) United States Patent
Echihabi et al.

(10) Patent No.: US 11,256,867 B2
(45) Date of Patent: Feb. 22, 2022

(54) SYSTEMS AND METHODS OF MACHINE LEARNING FOR DIGITAL ASSETS AND MESSAGE CREATION

(71) Applicant: SDL Inc., Wakefield, MA (US)

(72) Inventors: Abdessamad Echihabi, Los Angeles, CA (US); Bryant Huang, Santa Clarita, CA (US); Quinn Lam, Los Angeles, CA (US); Mihai Vlad, London (GB)

(73) Assignee: SDL Inc., Wakefield, MA (US)

( * ) Notice: Subject to any disclaimer, the term of this patent is extended or adjusted under 35 U.S.C. 154(b) by 70 days.

(21) Appl. No.: 16/155,658

(22) Filed: Oct. 9, 2018

(65) Prior Publication Data
US 2020/0110802 A1    Apr. 9, 2020

(51) Int. Cl.
*G06F 40/30* (2020.01)
*G06F 3/0484* (2022.01)
*G06F 3/0482* (2013.01)
*G06N 20/00* (2019.01)

(52) U.S. Cl.
CPC .......... *G06F 40/30* (2020.01); *G06F 3/0482* (2013.01); *G06F 3/0484* (2013.01); *G06N 20/00* (2019.01)

(58) Field of Classification Search
CPC ........ G06F 40/30; G06F 40/10; G06F 40/106; G06F 40/131; G06F 40/20; G06F 40/40; G06F 40/42; G06F 40/55; G06F 40/56
USPC .............................. 704/9, 1, 2, 4, 5, 10, 257
See application file for complete search history.

(56) References Cited

U.S. PATENT DOCUMENTS

| | | |
|---|---|---|
| 4,661,924 A | 4/1987 | Okamoto et al. |
| 4,674,044 A | 6/1987 | Kalmus et al. |
| 4,677,552 A | 6/1987 | Sibley, Jr. |
| 4,789,928 A | 12/1988 | Fujisaki |
| 4,845,658 A | 7/1989 | Gifford |
| 4,903,201 A | 2/1990 | Wagner |
| 4,916,614 A | 4/1990 | Kaji et al. |
| 4,920,499 A | 4/1990 | Skeirik |
| 4,962,452 A | 10/1990 | Nogami et al. |
| 4,992,940 A | 2/1991 | Dworkin |
| 5,005,127 A | 4/1991 | Kugimiya et al. |

(Continued)

FOREIGN PATENT DOCUMENTS

| | | | |
|---|---|---|---|
| AU | 5240198 A | | 5/1998 |
| AU | 694367 B2 | | 7/1998 |

(Continued)

OTHER PUBLICATIONS

First Examination Report dated Nov. 26, 2009 for European Patent Application 05772051.8, filed May 8, 2006, 8 pages.

(Continued)

*Primary Examiner* — Qi Han
(74) *Attorney, Agent, or Firm* — Carr & Ferrell LLP

(57) ABSTRACT

Systems and methods of machine learning for digital assets and message creation are provided herein. The present disclosure includes mechanisms for receiving one or more assets that include textual content, performing machine learning on the one or more assets in order to determine relevant words, phrases, and statistics included in the textual content, and displaying segments of data on a graphical user interface that also includes an interface that is used to create a message using content of the segments of the textual content that have been extracted from the one or more assets.

21 Claims, 15 Drawing Sheets

(56) References Cited

U.S. PATENT DOCUMENTS

| | | |
|---|---|---|
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,351,189 A | 9/1994 | Doi |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,555,343 A | 9/1996 | Luther |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,780 A | 1/1998 | Levergood et al. |
| 5,708,825 A | 1/1998 | Sotomayor |
| 5,710,562 A | 1/1998 | Gormish et al. |
| 5,715,314 A | 2/1998 | Payne et al. |
| 5,715,402 A | 2/1998 | Popolo |
| 5,724,424 A | 3/1998 | Gifford |
| 5,724,593 A | 3/1998 | Hargrave, III et al. |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,802,525 A | 9/1998 | Rigoutsos |
| 5,812,776 A | 9/1998 | Gifford |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A | 12/1998 | Yamauchi et al. |
| 5,845,306 A | 12/1998 | Schabes et al. |
| 5,848,386 A | 12/1998 | Motoyama |
| 5,850,442 A | 12/1998 | Muftic |
| 5,850,561 A | 12/1998 | Church et al. |
| 5,864,788 A | 1/1999 | Kutsumi |
| 5,873,056 A | 2/1999 | Liddy |
| 5,884,246 A | 3/1999 | Boucher et al. |
| 5,895,446 A | 4/1999 | Takeda et al. |
| 5,909,492 A | 6/1999 | Payne et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,372 A | 10/1999 | Barnes |
| 5,974,413 A | 10/1999 | Beauregard et al. |
| 5,987,401 A | 11/1999 | Trudeau |
| 5,987,403 A | 11/1999 | Sugimura |
| 6,044,344 A | 3/2000 | Kanevsky |
| 6,044,363 A | 3/2000 | Mori et al. |
| 6,047,299 A | 4/2000 | Kaijima |
| 6,049,785 A | 4/2000 | Gifford |
| 6,070,138 A | 5/2000 | Iwata |
| 6,085,162 A | 7/2000 | Cherny |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,260,008 B1 | 7/2001 | Sanfilippo |
| 6,278,969 B1 | 8/2001 | King et al. |
| 6,279,112 B1 | 8/2001 | O'toole, Jr. et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 | 2/2002 | Clark |
| 6,345,245 B1 | 2/2002 | Sugiyama et al. |
| 6,347,316 B1 | 2/2002 | Redpath |
| 6,353,824 B1 | 3/2002 | Boguraev et al. |
| 6,356,865 B1 | 3/2002 | Franz et al. |
| 6,385,568 B1 | 5/2002 | Brandon et al. |
| 6,393,389 B1 | 5/2002 | Chanod et al. |
| 6,401,105 B1 | 6/2002 | Carlin et al. |
| 6,415,257 B1 | 7/2002 | Junqua |
| 6,442,524 B1 | 8/2002 | Ecker et al. |
| 6,449,599 B1 | 9/2002 | Payne et al. |
| 6,470,306 B1 | 10/2002 | Pringle et al. |
| 6,473,729 B1 | 10/2002 | Gastaldo et al. |
| 6,477,524 B1 | 11/2002 | Taskiran |
| 6,490,358 B1 | 12/2002 | Geer et al. |
| 6,490,563 B2 | 12/2002 | Hon |
| 6,526,426 B1 | 2/2003 | Lakritz |
| 6,622,121 B1 | 9/2003 | Crepy et al. |
| 6,623,529 B1 | 9/2003 | Lakritz |
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,782,384 B2 | 8/2004 | Sloan et al. |
| 6,865,528 B1 | 3/2005 | Huang |
| 6,920,419 B2 | 7/2005 | Kitamura |
| 6,952,691 B2 | 10/2005 | Drissi et al. |
| 6,976,207 B1 | 12/2005 | Rujan |
| 6,990,439 B2 | 1/2006 | Xun |
| 6,993,473 B2 | 1/2006 | Cartus |
| 7,013,264 B2 | 3/2006 | Dolan |
| 7,020,601 B1 | 3/2006 | Hummel et al. |
| 7,031,908 B1 | 4/2006 | Huang |
| 7,050,964 B2 | 5/2006 | Menzes |
| 7,089,493 B2 | 8/2006 | Hatori et al. |
| 7,100,117 B1 | 8/2006 | Chwa et al. |
| 7,110,938 B1 | 9/2006 | Cheng et al. |
| 7,124,092 B2 | 10/2006 | O'toole, Jr. et al. |
| 7,155,440 B1 | 12/2006 | Kronmiller et al. |
| 7,177,792 B2 | 2/2007 | Knight |
| 7,185,276 B2 | 2/2007 | Keswa |
| 7,191,447 B1 | 3/2007 | Ellis et al. |
| 7,194,403 B2 | 3/2007 | Okura et al. |
| 7,207,005 B2 | 4/2007 | Laktritz |
| 7,209,875 B2 | 4/2007 | Quirk et al. |
| 7,249,013 B2 | 7/2007 | Al-Onaizan |
| 7,266,767 B2 | 9/2007 | Parker |
| 7,272,639 B1 | 9/2007 | Levergood et al. |
| 7,295,962 B2 | 11/2007 | Marcu |
| 7,295,963 B2 | 11/2007 | Richardson |
| 7,333,927 B2 | 2/2008 | Lee |
| 7,340,388 B2 | 3/2008 | Soricut |
| 7,343,551 B1 | 3/2008 | Bourdev |
| 7,353,165 B2 | 4/2008 | Zhou et al. |
| 7,369,984 B2 | 5/2008 | Fairweather |
| 7,389,222 B1 | 6/2008 | Langmead |
| 7,389,223 B2 | 6/2008 | Atkin |
| 7,448,040 B2 | 11/2008 | Ellis et al. |

(56) References Cited

U.S. PATENT DOCUMENTS

| | | |
|---|---|---|
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,533,338 B2 | 5/2009 | Duncan et al. |
| 7,580,828 B2 | 8/2009 | D'Agostini |
| 7,580,960 B2 | 8/2009 | Travieso et al. |
| 7,587,307 B2 | 9/2009 | Cancedda et al. |
| 7,594,176 B1 | 9/2009 | English |
| 7,596,606 B2 | 9/2009 | Codignotto |
| 7,620,538 B2 | 11/2009 | Marcu |
| 7,620,549 B2 | 11/2009 | Di Cristo |
| 7,624,005 B2 | 11/2009 | Koehn |
| 7,627,479 B2 | 12/2009 | Travieso et al. |
| 7,640,158 B2 | 12/2009 | Detlef et al. |
| 7,668,782 B1 | 2/2010 | Reistad et al. |
| 7,680,647 B2 | 3/2010 | Moore |
| 7,693,717 B2 | 4/2010 | Kahn et al. |
| 7,698,124 B2 | 4/2010 | Menezes et al. |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,865,358 B2 | 1/2011 | Green |
| 7,925,493 B2 | 4/2011 | Watanabe |
| 7,925,494 B2 | 4/2011 | Cheng et al. |
| 7,945,437 B2 | 5/2011 | Mount et al. |
| 7,983,896 B2 | 7/2011 | Ross et al. |
| 7,983,897 B2 | 7/2011 | Chin |
| 7,983,903 B2 | 7/2011 | Gao |
| 8,050,906 B1 | 11/2011 | Zimmerman et al. |
| 8,078,450 B2 | 12/2011 | Anisimovich et al. |
| 8,135,575 B1 | 3/2012 | Dean |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,244,519 B2 | 8/2012 | Bicici et al. |
| 8,249,855 B2 | 8/2012 | Zhou et al. |
| 8,275,604 B2 | 9/2012 | Jiang et al. |
| 8,286,185 B2 | 10/2012 | Ellis et al. |
| 8,296,127 B2 | 10/2012 | Marcu |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,407,217 B1 * | 3/2013 | Zhang ................. G06F 16/3344 707/731 |
| 8,423,346 B2 | 4/2013 | Seo et al. |
| 8,442,812 B2 | 5/2013 | Ehsani |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,620,793 B2 | 12/2013 | Knyphausen et al. |
| 8,635,327 B1 | 1/2014 | Levergood et al. |
| 8,635,539 B2 | 1/2014 | Young |
| 8,666,725 B2 | 3/2014 | Och |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,818,790 B2 | 8/2014 | He et al. |
| 8,843,359 B2 | 9/2014 | Lauder |
| 8,862,456 B2 | 10/2014 | Krack et al. |
| 8,874,427 B2 | 10/2014 | Ross et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,128,929 B2 | 9/2015 | Albat |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,262,403 B2 | 2/2016 | Christ |
| 9,342,506 B2 | 5/2016 | Ross et al. |
| 9,396,184 B2 | 7/2016 | Roy |
| 9,400,786 B2 | 7/2016 | Lancaster et al. |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,472 B2 | 3/2017 | Cheng et al. |
| 9,600,473 B2 | 3/2017 | Leydon |
| 9,613,026 B2 | 4/2017 | Hodson |
| 10,198,438 B2 | 2/2019 | Cheng et al. |
| 10,216,731 B2 | 2/2019 | Cheng et al. |
| 10,248,650 B2 | 4/2019 | Ross et al. |
| 10,635,863 B2 | 4/2020 | de Vrieze et al. |
| 10,817,676 B2 | 10/2020 | Vlad et al. |
| 2002/0002461 A1 | 1/2002 | Tetsumoto |
| 2002/0046018 A1 | 4/2002 | Marcu |
| 2002/0083103 A1 | 6/2002 | Ballance |
| 2002/0093416 A1 | 7/2002 | Goers et al. |
| 2002/0099547 A1 | 7/2002 | Chu et al. |
| 2002/0103632 A1 | 8/2002 | Dutta et al. |
| 2002/0107684 A1 | 8/2002 | Gao |
| 2002/0110248 A1 | 8/2002 | Kovales et al. |
| 2002/0111787 A1 | 8/2002 | Knyphausen et al. |
| 2002/0124109 A1 | 9/2002 | Brown |
| 2002/0138250 A1 | 9/2002 | Okura et al. |
| 2002/0165708 A1 | 11/2002 | Kumhyr |
| 2002/0169592 A1 | 11/2002 | Aityan |
| 2002/0188439 A1 | 12/2002 | Marcu |
| 2002/0198701 A1 | 12/2002 | Moore |
| 2003/0004702 A1 | 1/2003 | Higinbotham |
| 2003/0009320 A1 | 1/2003 | Furuta |
| 2003/0016147 A1 | 1/2003 | Evans |
| 2003/0040900 A1 | 2/2003 | D'Agostini |
| 2003/0069879 A1 | 4/2003 | Sloan et al. |
| 2003/0078766 A1 | 4/2003 | Appelt et al. |
| 2003/0105621 A1 | 6/2003 | Mercier |
| 2003/0110023 A1 | 6/2003 | Bangalore et al. |
| 2003/0120479 A1 | 6/2003 | Parkinson et al. |
| 2003/0125928 A1 | 7/2003 | Lee et al. |
| 2003/0158723 A1 | 8/2003 | Masuichi et al. |
| 2003/0182279 A1 | 9/2003 | Willows |
| 2003/0194080 A1 | 10/2003 | Michaelis et al. |
| 2003/0200094 A1 | 10/2003 | Gupta |
| 2003/0229622 A1 | 12/2003 | Middelfart |
| 2003/0233222 A1 | 12/2003 | Soricut et al. |
| 2004/0024581 A1 | 2/2004 | Koehn et al. |
| 2004/0034520 A1 | 2/2004 | Langkilde-Geary |
| 2004/0044517 A1 | 3/2004 | Palmquist |
| 2004/0102201 A1 | 5/2004 | Levin |
| 2004/0122656 A1 | 6/2004 | Abir |
| 2004/0172235 A1 | 9/2004 | Pinkham et al. |
| 2004/0255281 A1 | 12/2004 | Imamura et al. |
| 2005/0021323 A1 | 1/2005 | Li |
| 2005/0055212 A1 | 3/2005 | Nagao |
| 2005/0075858 A1 | 4/2005 | Pournasseh et al. |
| 2005/0076342 A1 | 4/2005 | Levins et al. |
| 2005/0094475 A1 | 5/2005 | Naoi |
| 2005/0149316 A1 | 7/2005 | Ushioda et al. |
| 2005/0171758 A1 | 8/2005 | Palmquist |
| 2005/0171944 A1 | 8/2005 | Palmquist |
| 2005/0197827 A1 | 9/2005 | Ross et al. |
| 2005/0222837 A1 | 10/2005 | Deane |

(56) References Cited

U.S. PATENT DOCUMENTS

| | | |
|---|---|---|
| 2005/0222973 A1 | 10/2005 | Kaiser |
| 2005/0273314 A1 | 12/2005 | Chang et al. |
| 2006/0015320 A1 | 1/2006 | Och |
| 2006/0095526 A1 | 5/2006 | Levergood et al. |
| 2006/0095848 A1 | 5/2006 | Naik |
| 2006/0136277 A1 | 6/2006 | Perry |
| 2006/0256139 A1 | 11/2006 | Gikandi |
| 2006/0282255 A1 | 12/2006 | Lu |
| 2006/0287844 A1 | 12/2006 | Rich |
| 2007/0043553 A1 | 2/2007 | Dolan |
| 2007/0112553 A1 | 5/2007 | Jacobson |
| 2007/0118378 A1 | 5/2007 | Skuratovsky |
| 2007/0136470 A1 | 6/2007 | Chikkareddy et al. |
| 2007/0150257 A1 | 6/2007 | Cancedda et al. |
| 2007/0192110 A1 | 8/2007 | Mizutani et al. |
| 2007/0230729 A1 | 10/2007 | Naylor et al. |
| 2007/0233460 A1 | 10/2007 | Lancaster et al. |
| 2007/0233463 A1 | 10/2007 | Sparre |
| 2007/0244702 A1 | 10/2007 | Kahn et al. |
| 2007/0294076 A1 | 12/2007 | Shore et al. |
| 2008/0077395 A1 | 3/2008 | Lancaster et al. |
| 2008/0086298 A1 | 4/2008 | Anismovich |
| 2008/0109374 A1 | 5/2008 | Levergood et al. |
| 2008/0141180 A1 | 6/2008 | Reed et al. |
| 2008/0147378 A1 | 6/2008 | Hall |
| 2008/0154577 A1 | 6/2008 | Kim |
| 2008/0201344 A1 | 8/2008 | Levergood et al. |
| 2008/0243834 A1 | 10/2008 | Rieman et al. |
| 2008/0270930 A1* | 10/2008 | Slosar ................... G06F 40/186 715/776 |
| 2008/0288240 A1 | 11/2008 | D'Agostini et al. |
| 2008/0294982 A1 | 11/2008 | Leung et al. |
| 2009/0094017 A1 | 4/2009 | Chen et al. |
| 2009/0132230 A1 | 5/2009 | Kanevsky et al. |
| 2009/0187577 A1 | 7/2009 | Reznik et al. |
| 2009/0204385 A1 | 8/2009 | Cheng et al. |
| 2009/0217196 A1 | 8/2009 | Neff et al. |
| 2009/0240539 A1 | 9/2009 | Slawson |
| 2009/0248182 A1 | 10/2009 | Logan et al. |
| 2009/0248482 A1 | 10/2009 | Knyphausen et al. |
| 2009/0313005 A1 | 12/2009 | Jaquinta |
| 2009/0326917 A1 | 12/2009 | Hegenberger |
| 2010/0057439 A1 | 3/2010 | Ideuchi et al. |
| 2010/0057561 A1 | 3/2010 | Gifford |
| 2010/0121630 A1 | 5/2010 | Mende et al. |
| 2010/0138213 A1 | 6/2010 | Bicici et al. |
| 2010/0179803 A1 | 7/2010 | Sawaf |
| 2010/0223047 A1 | 9/2010 | Christ |
| 2010/0241482 A1 | 9/2010 | Knyphausen et al. |
| 2010/0262621 A1 | 10/2010 | Ross et al. |
| 2011/0066469 A1 | 3/2011 | Kadosh |
| 2011/0077933 A1 | 3/2011 | Miyamoto et al. |
| 2011/0097693 A1 | 4/2011 | Crawford |
| 2011/0184719 A1 | 7/2011 | Christ |
| 2012/0022852 A1 | 1/2012 | Tregaskis |
| 2012/0046934 A1 | 2/2012 | Cheng et al. |
| 2012/0095747 A1 | 4/2012 | Ross et al. |
| 2012/0185235 A1 | 7/2012 | Albat |
| 2012/0330990 A1 | 12/2012 | Chen et al. |
| 2013/0173247 A1 | 7/2013 | Hodson |
| 2013/0325442 A1 | 12/2013 | Dahlmeier |
| 2013/0346062 A1 | 12/2013 | Lancaster et al. |
| 2014/0006006 A1 | 1/2014 | Christ |
| 2014/0012565 A1 | 1/2014 | Lancaster et al. |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0229257 A1 | 8/2014 | Reistad et al. |
| 2014/0297252 A1 | 10/2014 | Prasad et al. |
| 2014/0358519 A1 | 12/2014 | Mirkin |
| 2014/0358524 A1 | 12/2014 | Papula |
| 2014/0365201 A1 | 12/2014 | Gao |
| 2015/0032645 A1* | 1/2015 | Mckeown ............. G06Q 50/18 705/311 |
| 2015/0051896 A1 | 2/2015 | Simard |
| 2015/0142415 A1 | 5/2015 | Cheng et al. |
| 2015/0169554 A1 | 6/2015 | Ross et al. |
| 2015/0186362 A1 | 7/2015 | Li |
| 2016/0162473 A1 | 6/2016 | Cogley et al. |
| 2016/0162478 A1 | 6/2016 | Blassin et al. |
| 2016/0170974 A1 | 6/2016 | Martinez Corria et al. |
| 2016/0253319 A1 | 9/2016 | Ross et al. |
| 2017/0046333 A1 | 2/2017 | Mirkin et al. |
| 2017/0052954 A1* | 2/2017 | State ................... G06F 16/438 |
| 2017/0068664 A1 | 3/2017 | Martinez Corria et al. |
| 2017/0083523 A1* | 3/2017 | Philip ................... G06F 16/248 |
| 2017/0132214 A1 | 5/2017 | Cheng et al. |
| 2017/0169015 A1 | 6/2017 | Huang |
| 2018/0060287 A1* | 3/2018 | Srinivasan ............ G06F 40/131 |
| 2018/0137108 A1 | 5/2018 | Martinez Corria et al. |
| 2018/0300218 A1 | 10/2018 | Lipka et al. |
| 2018/0300318 A1 | 10/2018 | Sittel et al. |
| 2018/0307683 A1 | 10/2018 | Lipka et al. |
| 2019/0129946 A1 | 5/2019 | de Vrieze et al. |
| 2019/0171717 A1 | 6/2019 | Cheng et al. |
| 2019/0197116 A1 | 6/2019 | Vlad et al. |
| 2020/0175234 A1 | 6/2020 | de Vrieze et al. |
| 2021/0042476 A1 | 2/2021 | Vlad et al. |

FOREIGN PATENT DOCUMENTS

| | | |
|---|---|---|
| AU | 5202299 A | 10/1999 |
| AU | 199938259 A | 11/1999 |
| AU | 761311 B2 | 9/2003 |
| CA | 2221506 A1 | 12/1996 |
| CA | 2331184 C | 7/2009 |
| CN | 1179289 C | 12/2004 |
| CN | 1770144 A | 5/2006 |
| CN | 101019113 A | 8/2007 |
| CN | 101826072 A | 9/2010 |
| CN | 101248415 B | 10/2010 |
| CN | 102053958 A | 5/2011 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0262938 A1 | 4/1988 |
| EP | 0668558 A1 | 8/1995 |
| EP | 0830774 B1 | 2/1998 |
| EP | 0830774 A2 | 3/1998 |
| EP | 0887748 A2 | 12/1998 |
| EP | 1076861 A1 | 2/2001 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 1266313 A2 | 12/2002 |
| EP | 1489523 A2 | 12/2004 |
| EP | 1076861 B1 | 6/2005 |
| EP | 1787221 A2 | 5/2007 |
| EP | 1889149 A2 | 2/2008 |
| EP | 2226733 A1 | 9/2010 |
| EP | 2299369 A1 | 3/2011 |
| EP | 2317447 A1 | 5/2011 |
| EP | 2336899 A2 | 6/2011 |
| EP | 2317447 B1 | 1/2014 |
| EP | 3732592 | 11/2020 |
| GB | 2241359 A | 8/1991 |
| GB | 2433403 A | 6/2007 |
| GB | 2468278 A | 9/2010 |
| GB | 2474839 A | 5/2011 |
| JP | H04152466 A | 5/1992 |
| JP | H05135095 A | 6/1993 |
| JP | H05197746 A | 8/1993 |
| JP | H06035962 A | 2/1994 |
| JP | H06259487 A | 9/1994 |
| JP | H07093331 A | 4/1995 |
| JP | H08055123 A | 2/1996 |
| JP | H09114907 A | 5/1997 |
| JP | H10063747 A | 3/1998 |

(56) References Cited

FOREIGN PATENT DOCUMENTS

| | | |
|---|---|---|
| JP | H10097530 A | 4/1998 |
| JP | H10509543 A | 9/1998 |
| JP | H11507752 A | 7/1999 |
| JP | 3190881 B2 | 7/2001 |
| JP | 3190882 B2 | 7/2001 |
| JP | 3260693 B2 | 2/2002 |
| JP | 2002513970 A | 5/2002 |
| JP | 3367675 B2 | 1/2003 |
| JP | 2003150623 A | 5/2003 |
| JP | 2003157402 A | 5/2003 |
| JP | 2004318510 A | 11/2004 |
| JP | 2005107597 A | 4/2005 |
| JP | 3762882 B2 | 4/2006 |
| JP | 2006216073 A | 8/2006 |
| JP | 2007042127 A | 2/2007 |
| JP | 2007249606 A | 9/2007 |
| JP | 2008152670 A | 7/2008 |
| JP | 2008152760 A | 7/2008 |
| JP | 4485548 B2 | 6/2010 |
| JP | 4669373 B2 | 4/2011 |
| JP | 4669430 B2 | 4/2011 |
| JP | 2011095841 A | 5/2011 |
| JP | 4718687 B2 | 7/2011 |
| JP | 5473533 B2 | 4/2014 |
| WO | WO199406086 A1 | 3/1994 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9804061 A1 | 1/1998 |
| WO | WO9819224 A2 | 5/1998 |
| WO | WO9952626 A1 | 10/1999 |
| WO | WO199957651 A1 | 11/1999 |
| WO | WO2000057320 A2 | 9/2000 |
| WO | WO200101289 A1 | 1/2001 |
| WO | WO200129696 A1 | 4/2001 |
| WO | WO2002029622 A1 | 4/2002 |
| WO | WO2002039318 A1 | 5/2002 |
| WO | WO2006016171 A2 | 2/2006 |
| WO | WO2006121849 A2 | 11/2006 |
| WO | WO2007068123 A1 | 6/2007 |
| WO | WO2008055360 A1 | 5/2008 |
| WO | WO2008083503 A1 | 7/2008 |
| WO | WO2008147647 A1 | 12/2008 |
| WO | WO2010062540 A1 | 6/2010 |
| WO | WO2010062542 A1 | 6/2010 |
| WO | WO2019133506 A1 | 7/2019 |

OTHER PUBLICATIONS

Second Examination Report dated Feb. 19, 2013 for European Patent Application 06759147.9, filed May 8, 2006, 5 pages.
Langlais, et al. "TransType: a Computer-Aided Translation Typing System", in Conference on Language Resources and Evaluation, 2000, pp. 46-51.
First Notice of Reasons for Rejection dated Jun. 18, 2013 for Japanese Patent Application 2009-246729, filed Oct. 27, 2009, 3 pages.
First Notice of Reasons for Rejection dated Jun. 4, 2013 for Japanese Patent Application 2010-045531, filed Oct. 27, 2009, 4 pages.
Rejection Decision dated May 14, 2013 for Chinese Patent Application 200910253192.6, filed Dec. 14, 2009, 9 pages.
Matsunaga, et al. "Sentence Matching Algorithm of Revised Documents with Considering Context Information," IEICE Technical Report, 2003, pp. 43-48.
Pennington, Paula K. Improving Quality in Translation Through an Awareness of Process and Self-Editing Skills. Eastern Michigan University, ProQuest, UMI Dissertations Publishing, 1994, 115 pages.
Notice of Allowance dated Jan. 7, 2014 for Japanese Patent Application 2009-246729, filed Oct. 27, 2009, 3 pages.
Kumano et al., "Japanese-English Translation Selection Using Vector Space Model," Journal of Natural Language Processing; vol. 10; No. 3; (2003); pp. 39-59.
Final Rejection and a Decision to Dismiss the Amendment dated Jan. 7, 2014 for Japanese Patent Application 2010-045531, filed Mar. 2, 2010, 4 pages.
Office Action dated Feb. 24, 2014 for Chinese Patent Application No. 201010521841.9, filed Oct. 25, 2010, 30 pages.
Extended European Search Report dated Oct. 24, 2014 for European Patent Application 10185842.1, filed Oct. 1, 2010, 8 pages.
Summons to attend oral proceeding pursuant to Rule 115(1)(EPC) mailed Oct. 13, 2014 in European Patent Application 00902634.5 filed Jan. 26, 2000, 8 pages.
Summons to attend oral proceeding pursuant to Rule 115(1)(EPC) mailed Feb. 3, 2015 in European Patent Application 06759147.9 filed May 8, 2006, 5 pages.
Decision to Refuse mailed Mar. 2, 2015 in European Patent Application 00902634.5 filed Jan. 26, 2000, 15 pages.
Brief Communication mailed Jun. 17, 2015 in European Patent Application 06759147.9 filed May 8, 2006, 20 pages.
Somers, H. "EBMT Seen as Case-based Reasoning" Mt Summit VIII Workshop on Example-Based Machine Translation, 2001, pp. 56-65, XP055196025.
Minutes of Oral Proceedings mailed Mar. 2, 2015 in European Patent Application 00902634.5 filed Jan. 26, 2000, 19 pages.
Notification of Reexamination mailed Aug. 18, 2015 in Chinese Patent Application 200910253192.6, filed Dec. 14, 2009, 24 pages.
Decision to Refuse mailed Aug. 24, 2015 in European Patent Application 06759147.9, filed May 8, 2006, 26 pages.
Papineni, Kishore, et al., "BLEU: A Method for Automatic Evaluation of Machine Translation," Proceedings of the 40th Annual Meeting on Association for Computational Linguistics. Association for Computational Linguistics, 2002, pp. 311-318.
"Office Action," European Patent Application No. 10185842.1, dated Dec. 8, 2016, 7 pages.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine

(56) References Cited

OTHER PUBLICATIONS

Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.
Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet:<https://lilt.com/kb/translators/best-practices>, 2 pages.
"Data Security—Knowledge Base," Lilt website [online], Oct. 14, 2016 [retrieved on Oct. 19, 2017], Retrieved from the Internet:<https://lilt.com/kb/security>, 1 pages.
"Data Security and Confidentiality," Lilt website [online], 2017 [retrieved on Oct. 19, 2017], Retrieved from the Internet: <https://lilt.com/security>, 7 pages.
"Memories—Knowledge Base," Lilt website [online], Jun. 7, 2017 [retrieved on Oct. 19, 2017], Retrieved from the Internet:<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet:<https://lilt.com/kb/api/memories>, 1 page.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt—Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
Komatsu, H et al, "Corpus-based predictive text input", "Proceedings of the 2005 International Conference on Active Media Technology", 2005, IEEE, pp. 75 80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111 131.
De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan, pp. 107-114. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005], 7 pages.
Net Auction, www.netauction.net/dragonart.html, "Come bid on original illustrations," by Greg & Tim Hildebrandt, Feb. 3, 2001. (last accessed Nov. 16, 2011), 3 pages.
Web Pages—BidNet, www.bidnet.com, "Your link to the State and Local Government Market," including Bid Alert Service, Feb. 7, 2009. (last accessed Nov. 16, 2011), 1 page.
Web Pages Christie's, www.christies.com, including "How to Buy," and "How to Sell," Apr. 23, 2009. (last accessed Nov. 16, 2011), 1 page.
Web Pages Artrock Auction, www.commerce.com, Auction Gallery, Apr. 7, 2007. (last accessed Nov. 16, 2011), 1 page.
Trados Translator's Workbench for Windows, 1994-1995, Trados GbmH, Stuttgart, Germany, pp. 9-13 and 27-96. Copy unavailable.
Notification of Reasons for Refusal for Japanese Application No. 2000-607125 dated Nov. 10, 2009 (Abstract Only), 3 pages.
Ross et al., U.S. Appl. No. 11/071,706, filed Mar. 3, 2005, Office Communication dated Dec. 13, 2007, 19 pages.
Ross et al., U.S. Appl. No. 11/071,706, filed Mar. 3, 2005, Office Communication dated Oct. 6, 2008, 36 pages.
Ross et al., U.S. Appl. No. 11/071,706, filed Mar. 3, 2005, Office Communication dated Jun. 9, 2009, 37 pages.
Ross et al., U.S. Appl. No. 11/071,706, filed Mar. 3, 2005, Office Communication dated Feb. 18, 2010, 37 pages.
Colucci, Office Communication for U.S. Appl. No. 11/071,706 dated Sep. 24, 2010, 18 pages.
Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.
International Search Report and Written Opinion dated Sep. 4, 2007 in Patent Cooperation Treaty Application No. PCT/US06/17398, 9 pages.
XP002112717 Machine translation software for the Internet, Harada K.; et al., vol. 28, Nr:2, pp. 66-74. Sanyo Technical Review San'yo Denki Giho, Hirakata, JP ISSN 0285-516X, Oct. 1, 1996.

(56) References Cited

OTHER PUBLICATIONS

XP 000033460 Method to Make a Translated Text File Have the Same Printer Control Tags as the Original Text File, vol. 32, Nr:2, pp. 375-377, IBM Technical Disclosure Bulletin, International Business Machines Corp. (Thornwood), US ISSN 0018-8689, Jul. 1, 1989.
XP 002565038—Integrating Machine Translation into Translation Memory Systems, Matthias Heyn, pp. 113-126, TKE. Terminology and Knowledge Engineering. Proceedings International Congress On Terminology and Knowledge Engineering, Aug. 29-30, 1996.
XP 002565039—Linking translation memories with example-based machine translation, Michael Carl; Silvia Hansen, pp. 617-624, Machine Translation Summit. Proceedings, Sep. 1, 1999.
XP 55024828 TransType2 An Innovative Computer-Assisted Translation System, ACL 2004, Jul. 21, 2004, Retrieved from the Internet: http://www.mt-archive.info/ACL-2004-Esteban.pdf [retrieved on Apr. 18, 2012], 4 pages.
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland, 10 pages.
Sanfillipo, Section 5.2 Multiword Recognition and Extraction, Eagles LE3-4244, Preliminary Recommendations on Lexical Semantic Encoding, Jan. 7, 1999, pp. 176-186.
Hindle et al., Structural Ambiguity and lexical Relations, 1993, Association for Computational Linguistics, vol. 19, No. 1, pp. 103-120.
Ratnaparkhi, A Maximum Entropy Model for Part-Of-Speech Tagging, 1996, Proceedings for the conference on empirical methods in natural language processing, V.1, pp. 133-142.
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. of EAMT, 2006, pp. 33-40 (2006).
Okura, Seiji et al., "Translation Assistance by Autocomplete," The Association for Natural Language Processing, Publication 13th Annual Meeting Proceedings, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Nonparallel, Comparable Texts," Proceeding COLING '998 Proceedings of the 17th International Conference on Computational Linguistics, 1998, pp. 414-420.
First Office Action dated Dec. 26, 2008 in Chinese Patent Application 200580027102.1, filed Aug. 11, 2005, 7 pages.
Second Office Action dated Aug. 28, 2009 in Chinese Patent Application 200580027102.1, filed Aug. 11, 2005, 8 pages.
Third Office Action dated Apr. 28, 2010 in Chinese Patent Application 200580027102.1, filed Aug. 11, 2005, 8 pages.
Summons to attend oral proceeding pursuant to Rule 115(1)(EPC) mailed Mar. 20, 2012 in European Patent Application 05772051.8 filed Aug. 11, 2005, 7 pages.
Notification of Reasons for Rejection dated Jan. 9, 2007 for Japanese Patent Application 2000-547557, filed Apr. 30, 1999, 2 pages.
Decision of Rejection dated Jul. 3, 2007 for Japanese Patent Application 2000-547557, filed Apr. 30, 1999, 2 pages.
Extended European Search Report and Written Opinion dated Jan. 26, 2011 for European Patent Application 10189145.5, filed on Oct. 27, 2010, 9 pages.
Notice of Reasons for Rejection dated Jun. 26, 2012 for Japanese Patent Application P2009-246729. filed Oct. 27, 2009, 8 pages.
Search Report dated Jan. 22, 2010 for United Kingdom Application GB0918765.9, filed Oct. 27, 2009, 5 pages.
Notice of Reasons for Rejection dated Mar. 30, 2010 for Japanese Patent Application 2007-282902. filed Apr. 30, 1999, 5 pages.
Decision of Rejection dated Mar. 15, 2011 for Japanese Patent Application 2007-282902, filed Apr. 30, 1999, 5 pages.
First Office Action dated Oct. 18, 2011 for Chinese Patent Application 2009102531926, filed Dec. 14, 2009, 7 pages.
Second Office Action dated Aug. 14, 2012 for Chinese Patent Application 2009102531926, filed Dec. 14, 2009, 6 pages.
European Search Report dated Apr. 12, 2010 for European Patent Application 09179150.9, filed Dec. 14, 2009, 6 pages.
First Examination Report dated Jun. 16, 2011 for European Patent Application 09179150.9, filed Dec. 14, 2009, 6 pages.
Notice of Reasons for Rejection dated Jul. 31, 2012 for Japanese Patent Application 2010-045531, filed Mar. 2, 2010, 10 pages.
First Examination Report dated Oct. 26, 2012 for United Kingdom Patent Application GB0903418.2, filed Mar. 2, 2009, 6 pages.
First Office Action dated Jun. 19, 2009 for Chinese Patent Application 200680015388.6, filed May 8, 2006, 15 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API _ API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base,"Lilt website [online], Jun. 7, 2017, retrieved on Oct. 20, 2017, Retrieved from the Internet: <https://lilt.com/kb/project-managers/projects>, 3 pages.
"Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.
Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.
Sethy et al., "Building Topic Specific Language Models Fromwebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http:ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retrieved from Retrieved at http://www.mt-archive.info/EAMT-2011-Potet.pdf.

(56) References Cited

OTHER PUBLICATIONS

Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.

Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.

Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.

Levenberg et al."Stream-based Translation Models for Statistical Machine Translation" Human Language Technologies: The 2010 Annual Conference of the North American Chapter of the ACL, Dec. 31, 2010, pp. 394-402.

Lagarda et al. "Statistical Post-Editing of a Rule Based Machine Translation System" Proceedings of NAACL HLT 2009: Short Papers, Jun. 2009, pp. 217-220.

Ehara, "Rule Based Machine Translation Combined with Statistical Post Editor for Japanese to English Patent Translation," MT Summit XI, 2007, pp. 13-18.

Bechara et al. "Statistical Post-Editing for a Statistical MT System" Proceedings of the 13th Machine Translation Summit, 2011, pp. 308-315.

"Summons to attend oral proceeding pursuant to Rule 115(1)(EPC)," European Patent Application 10185842.1, Aug. 11, 2017, 9 pages.

Westfall, Edith R., "Integrating Tools with the Translation Process North American Sales and Support," Jan. 1, 1998, pp. 501-505, XP055392884. Retrieved from the Internet: <URL:https://rd.springer.com/content/pdf/10.1007/3-540-49478-2_46.pdf>.

"Summons to attend oral proceeding pursuant to Rule 115(1)(EPC)," European Patent Application 09179150.9, Dec. 14, 2017, 17 pages.

"Decision to Refuse," European Patent Application 10185842.1, Mar. 22, 2018, 16 pages.

"International Search Report" and "Written Opinion of the International Searching Authority," Patent Cooperation Treaty Application No. PCT/US2018/067213, dated Mar. 25, 2019, 7 pages.

"Extended European Search Report", European Patent Application No. 18895751.8, dated Aug. 24, 2021, 8 pages.

\* cited by examiner

FIG. 3A

**SDL* Copywriting Assistant** — eBOOK - Global Content Operating Model

✎ SUMMARY
Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

❝ QUOTES
- a company can scale and replicate.
- companies see value in a global content operating model regardless of the number of languages that need to be supported
- companies will need a global content operating model that balances global efficiency with local control.
- nearly half of enterprises are planning to move a global content operating model within 24 months, anticipating better brand consistency and improved customer experience.

💡 SPOTLIGHT
☐ Click the surrounding checkboxes to explore your content

📊 STATS
- ...global content operating model within 24 months, anticipating better brand consistency ...
- Forrester conducted in-depth surveys with 151 business and IT professionals in the ...
- Forrester's study yielded five key findings:

🔍 KEYWORDS
- ☐ ♙ Forrester
- ☐ ● Grow
- ☐ content
- ☐ companies

✎ SMART CHANNEL EDITOR
☐ Twitter ☒ Email ☑ Blog

Compose a Tweet

[Type your tweet here]

280 characters left

[+Add] [×Clear]

**SDL* Copywriting Assistant**

☆ SUMMARY — +

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

🔍 KEYWORDS — +

- ☆ Forrester
- ● Grow
- □ content
- □ companies eBOOK - Global Content Operating Model ▷

💡 SPOTLIGHT — +

○○○○○ A global content operating model can alleviate challenges and provide clear benefits.

○○○○○ Once a company has optimized its Global Content Operating Model, content drives experiences that meet customer expectations.

○○○○○ Forrester developed a hypothesis asserting that companies will need a global content operating model that balances global efficiency with local control ○○○○○ Our study found that companies see value in a global content operating model regardless of the number languages that need to be supported.

○○○○○ While only 19% of enterprises have a global content operating model today, an additional 48% plan to adopt one in the next two years.

○○○○○ The Global Content Operating Model (GCOM) provides a comprehensive strategic approach to managing your content across departments by unifying platforms and processes to address global content creation, translation and delivery.

○○○○○ The company employs everything learned from previous phases, building on existing processes, technology and skill sets to realize a fully Autonomous Global Content Operating Model.

✏ SMART CHANNEL EDITOR

GlobalContentOperatingModel   #Forrester   #AutonomousGlobalContentOperatingModel 🐦 Twitter   ✉ Email   📝 Blog Compose a Tweet

[Type your tweet here]

280 characters left   [+Add]   [× Clear]

❝ QUOTES — +

- □ a company can scale and replicate.
- □ companies see value in a global content operating model regardless of the number of languages that need to be supported
- □ companies will need a global content operating model that balances global efficiency with local control.
- □ nearly half of enterprises are planning to move a global content operating model within 24 months, anticipating better brand consistency and improved customer experience.

📊 STATS

- □ ...global content operating model within 24 months, anticipating better brand consistency ...
- □ Forrester conducted in-depth surveys with 151 business and IT professionals in the ...
- □ Forrester's study yielded five key findings:

FIG. 3B

**SDL* Copywriting Assistant**

✎ SUMMARY

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

🔍 KEYWORDS

- companies
- a global content operating model
- Global Content Operating Model
- a company
- consumers
- customers eBOOK - Global Content Operating Model

💡 SPOTLIGHT

○○○○○ Forrester conducted in-depth surveys with 151 business and IT professionals in the US, and found that nearly half of enterprises are planning to move to a global content operating model within 24 months, anticipating better brand consistency and improved customer experience.

○○○○○ While only 19% of enterprises have a global content operating model today, an additional 48% plan to adopt one in the next two years.

○○○○○ A global content operating model can alleviate challenges and provide clear benefits.

○○○○○ Once a company has optimized its Global Content Operating Model, content drives experiences that meet customer expectations.

○○○○○ Forrester developed a hypothesis asserting that companies will need a global content operating model that balances global efficiency with local control.

○○○○○ Enterprises struggle with localization.

○○○○○ Our study found that companies see value in a global content operating model regardless of the number of languages that need to be supported.

GlobalContentOperatingModal  #Forrester

✎ SMART CHANNEL EDITOR

🐦 Twitter   ✉ Email   📝 Blog

Compose a Tweet

Do you have a global content operating model strategy in place to drive greater customer experience? Get started with SDL eBook! #GlobalContentOperatingModel #Gl

❝ QUOTES

- companies see value in a global content operating model regardless of the number of languages that need to be supported
- companies will need a global content operating model that balances global efficiency with local control.
- nearly half of enterprises are planning to move a global content operating model with in 24 months, anticipating better brand consistency and improved customer experience.
- personalized home page promotions influenced 85% of consumers to buy will personalized shopping cart

📊 STATS

- Professionals in the...
- Forrester's study yielded five key findings:
- While only 19% of enterprises have a global content operating...
- ...plan to adopt one in the next two years.

FIG. 3D

**SDL\* Copywriting Assistant** — eBOOK - Global Content Operating Model

✏ SUMMARY

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

🔍 SPOTLIGHT

- ○○○○○ Forrester conducted in-depth surveys with 151 business and IT professionals in the US, and found that nearly half of enterprises are planning to move to a global content operating model within 24 months, anticipating better brand consistency and improved customer experience.
- ○○○○○ While only 19% of enterprises have a global content operating model today, an additional 48% plan to adopt one in the next two years.
- ○○○○○ A global content operating model can alleviate challenges and provide clear benefits.
- ○○○○○ Once a company has optimized its Global Content Operating Model, content drives experiences that meet customer expectations.
- ○○○○○ Forrester developed a hypothesis asserting that companies will need a global content operating model that balances global efficiency with local control.
- ○○○○○ Enterprises struggle with localization.
- ○○○○○ Our study found that companies see value in a global content operating model regardless of the number of languages that need to be supported.

❝ QUOTES

- □ companies see value in a global content operating model regardless of the number of languages that need to be supported
- □ companies will need a global content operating model that balances global efficiency with local control.
- □ nearly half of enterprises are planning to move a global content operating model with in 24 months, anticipating better brand consistency and improved customer experience.
- □ personalized home page promotions influenced 85% of consumers to buy will personalized shopping cart

📊 STATS

- □ Forrester's study yielded five key findings:
- □ While only 19% of enterprises have a global content operating ...
- □ ...plan to adopt one in the next two years.

🔎 KEYWORDS

- □ a global content operating model
- □ Global Content Operating Model
- □ a company
- □ consumers
- □ customers

✏ SMART CHANNEL EDITOR

GlobalContentOperatingModal  #Forrester

🐦 Twitter  ☒ Email  📝 Blog

Compose a Tweet

Type your tweet here 280 characters left   +Add   ✕ Clear

FIG. 3E

SYSTEMS AND METHODS OF MACHINE LEARNING FOR DIGITAL ASSETS AND MESSAGE CREATION

CROSS REFERENCE TO RELATED APPLICATIONS

N/A

FIELD OF THE INVENTION

The present disclosure pertains to machine learning within the context of digital asset processing and message creation. Systems and methods disclosed herein are configured to ingest digital assets from a variety of sources, evaluate textual content of these digital assets, and automate (either partially or entirely) the creation of messages for distribution across one or more digital distribution platforms.

SUMMARY

A system of one or more computers can be configured to perform particular operations or actions by virtue of having software, firmware, hardware, or a combination of them installed on the system that in operation cause or causes the system to perform the actions. One or more computer programs can be configured to perform particular operations or actions by virtue of including instructions that, when executed by data processing apparatus, cause the apparatus to perform the actions. One general aspect includes a method, including: receiving one or more assets that comprise textual content; performing machine learning on the one or more assets in order to determine relevant words, phrases, and statistics included in the textual content, and generate a summary of the textual content; displaying on a graphical user interface: the relevant words based on frequency of occurrence in the one or more assets, each of the relevant words being selectable; the phrases, each of the phrases being selectable; the statistics, each of the statistics being selectable; segments of the textual content that have been extracted from the one or more assets based on selected ones of the relevant words, the phrases and the statistics; and an interface that is used to create a message using content from the segments of the textual content that have been extracted from the one or more assets. Other embodiments of this aspect include corresponding computer systems, apparatus, and computer programs recorded on one or more computer storage devices, each configured to perform the actions of the methods.

Another general aspect the method includes: performing machine learning on one or more assets having textual content in order to determine relevant words, phrases, and statistics included in the textual content, and generate a summary of the textual content; and displaying, on a graphical user interface, segments of the textual content that have been extracted from the one or more assets based on selected ones of the relevant words, the phrases and the statistics, and an interface that is used to create a message using content from the segments of the textual content that have been extracted from the one or more assets.

One general aspect includes a system, including: an asset analyzer module configured to receive one or more assets that comprise textual content; a machine learning module configured to perform machine learning on the one or more assets in order to determine relevant words, phrases, and statistics included in the textual content, and generate a summary of the textual content; a graphical user interface module configured to display on a graphical user interface: the relevant words based on frequency of occurrence in the one or more assets, each of the relevant words being selectable; the phrases, each of the phrases being selectable; the statistics, each of the statistics being selectable; segments of the textual content that have been extracted from the one or more assets based on selected ones of the relevant words, the phrases and the statistics; and an interface that is used to create a message using content from the segments of the textual content that have been extracted from the one or more assets.

Other embodiments of this aspect include corresponding computer methods and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
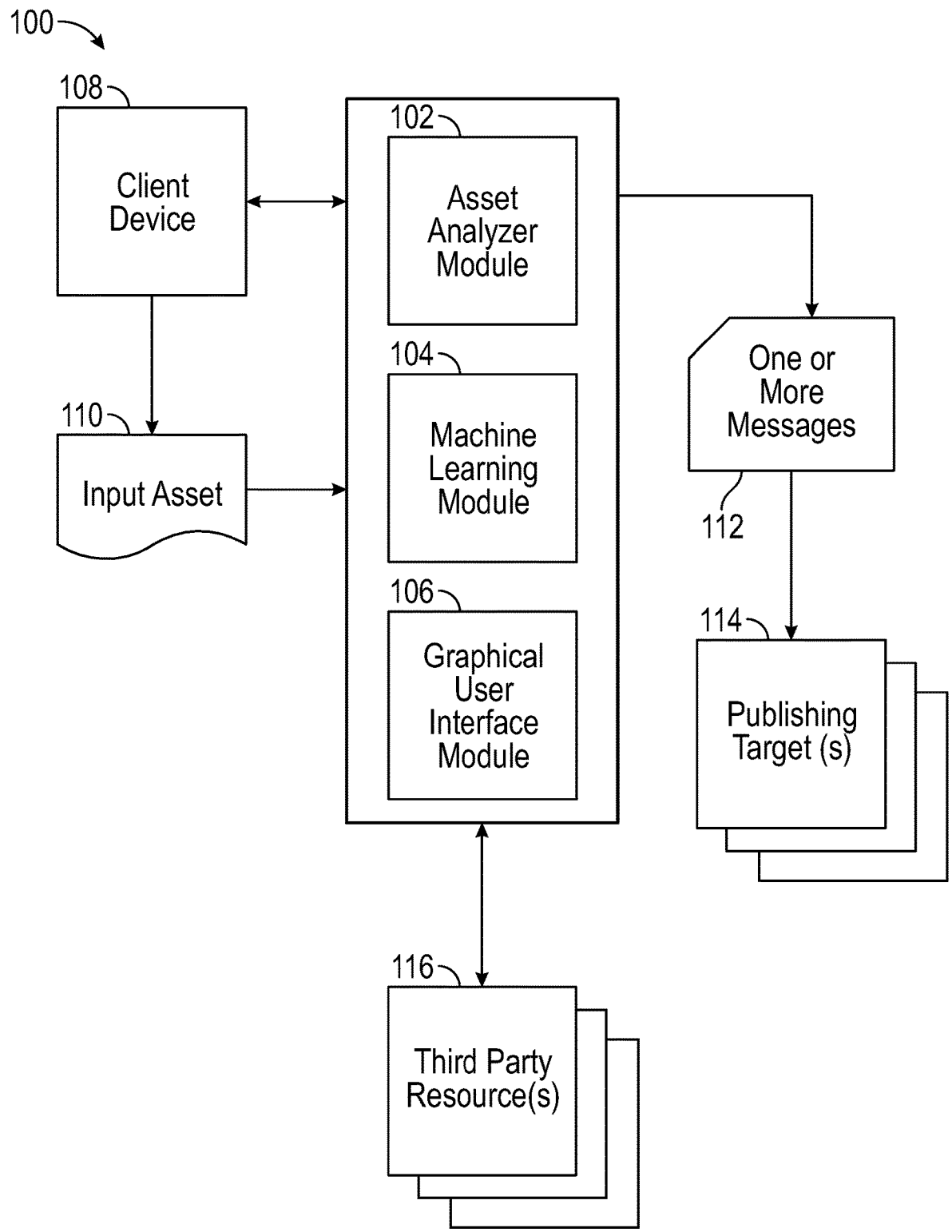
FIG. 1 is a schematic diagram of a system for use in practicing aspects of the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

As noted above, the present disclosure is directed to systems and methods that are configured to ingest digital assets from a variety of sources, evaluate textual content of these digital assets, and automate (either partially or entirely) the creation of messages for distribution across one or more digital distribution platforms.

In general, the systems and methods herein provide an artificial intelligence (AI) or machine learning driven content creation assistant (referred to generally as a copyrighting assistant) that enables the automated creation of messages for distribution across one or more channels of communication. Example communications channels include, but are not limited to, social networks (such as Twitter™, Facebook™, and so forth), email, blogs, and webpage—just to name a few.

The systems and methods disclosed herein provide a technical solution to a problem within the field of automated content creation. To be sure, content creation is a cumbersome and time consuming process. Often times, messages for use on social media or other mediums are created from more comprehensive digital assets such as technical papers or website content. As such, the content of messages created from these more comprehensive digital assets are controlled by the subjective biases of the author. That is, the author uses their best judgement in order to create compelling content for their messages. This is especially difficult when the content author is not a subject matter expert relative to the content in the comprehensive digital asset(s).

The systems and methods herein overcome these subjective drawbacks by incorporating machine learning/AI capabilities that can utilize a ruleset or model in order to pre-process comprehensive digital assets (referred to generally as input assets) and automatically convert (either partly created or wholly) those assets into messages that can be automatically distributed to one or more publishing targets.

The systems and methods enable the generation of relevant content and variations thereof without requiring an author to possess the full subject matter expertise of the author who created the comprehensive digital assets. This allows for efficient and quick creation of relevant content that is distributed to various channels and/or to various audiences. These and other advantages of the present disclosure are provided in greater detail infra with reference to the collective drawings.

FIG. 1 is a schematic diagram of an example system 100 that can be utilized to practice aspects of the present disclosure. The system 100 generally comprises an asset analyzer module 102, a machine learning module 104, and a graphical user interface module 106. It will be understood that the modules of the system 100 can be aggregated into a single physical or virtual machine in some embodiments, such as a server. In other embodiments, the modules of the system 100 can be distributed across a plurality of physical or virtual machines, such as a cloud.

In some embodiments, the system 100 is configured for interaction with one or more client devices, such as client device 108. The client device 108 can include any end-user computing device such as a laptop or smartphone. The client device 108 can interact with the system 100 in a server/client relationship, in some embodiments, through the use of graphical user interfaces (GUIs) as disclosed herein. The GUIs can be delivered through an application that resides and executes on the client device 108. Alternatively, the GUIs can be accessed by the client device 108 through a web-based form provided by the graphical user interface module 106.

As noted above, the system 100 is configured generally to utilize AI/machine learning in order to allow an author to partially or completely automate the creation of message content based on one or more input assets. For example, if a company creates a technical document that describes a new offering or service, the system 100 can ingest that input asset 110 and perform a variety of machine learning processes on that input asset 110 in order to convert that input asset 110 into one or more messages 112 that are then published to one or more publishing targets 114.

Content of one or more messages 112 created by the system 100 is created from content extracted from an input asset 110 and processed by the system 100 using machine learning. The input asset 110 is ingested and analyzed by the system 100 to extract information such as key topics (words/phrases), facts, statistics, quotes, and so forth. These extracted data are used to pre-populate the content of the one or more messages 112 in some embodiments. In other embodiments, the information extracted from the input asset 110 can be placed into various windows of a GUI that a message author uses to create the one or more messages 112. To be sure, in some embodiments, the system 100 can evaluate more than one input asset 110 at a time using machine learning.

Figure 2:
FIG. 2 is a graphical user interface that allows a message author to input or select an input asset.

Referring now collectively to FIGS. 1 and 2, in more detail, the graphical user interface module 106 can be executed to generate a GUI 200 that allows a message author to input or select the input asset 110, which in this example includes a technical document titled "Global Content Operating Manual" reflected in the name dialogue area. Documents are selected using a button 202. The button 202 allows the message author to search and select documents either locally (on the client device 108) or remotely. The GUI 200 allows the user to select one or more channels 204 for distribution of any messages generated in response to the processing of the input asset 110 by the system 100.

In general the input asset 110 (e.g., one or more assets) comprises textual content. The input asset 110 or assets can be obtained from a third party resource 116 (see FIG. 1). In some instances, a third party resource can include any repository of assets having content that is related to the content included in the input asset 110. That is, a user can select the input asset 110. The machine learning module 104 can process textual content of the input asset 110 and use content extracted from the input asset 110 such as keywords/phases, statistics, facts, quotes, and other data as the basis for searching the Internet or another third party document repository for additional input asset(s) that have content which is similar in subject matter to the input asset 110 selected by the user.

In one specific example, content extracted from the input asset 110 selected by the user can be used as a query that is searched against the one or more publishing targets 114 that will ultimately receive the message created through the system 100. For example, content such as keywords extracted from the Global Content Operating Manual can be used as the basis of a query that is executed against a social network where a message will eventually be published. The asset analyzer module 102 of the system 100 can utilize an application programming interface (API) to connect to the third party resource 116 (or one or more publishing targets 114), which in this example is a social network. Results from the query can include content found on the social network that corresponds to the keywords extracted from the input asset 110. The content obtained from the social network by the asset analyzer module 102 can be combined with the input asset 110 and analyzed collectively by the machine learning module 104. In sum, the corpus of content that is used to generate messages by the system 100 can be extended by searching various third party resources, some of which can include the channels (e.g., publishing targets) where messages are published by the system 100.

Stated otherwise, the system 100 can utilize an application programming interface (or equivalent) to search social networks (or other third party sites) for third party content that matches the one or more input assets. The system 100 will effectively incorporate the third party content with the one or more input assets during the machine learning such that the relevant words, phrases, and statistics (or other types of extracted content) are based on both the one or more input assets and the third party content in combination.

The textual content extracted from the one or more input assets (whether selected by the user and/or found in a search) is ultimately processed using the machine learning module 104. In more detail, the machine learning module 104 is configured to perform AI processing on the one or more assets in order to determine content that is indicative of subject matter included in the one or more assets. In some embodiments, the machine learning module 104 can utilize a ruleset in order to define types of content that are located and/or extracted from within the one or more assets.

In some embodiments, the machine learning module 104 is utilized to determine content such as relevant words, phrases, quotes facts, statistics included in the textual content of the machine learning module 104. In various embodiments, the machine learning module 104 can generate a summary of the textual content included in each discrete input asset.

In one embodiment, relevant words or phrases can be determined from a frequency or word count. That is, if a word is repeated numerous times in a document it is likely to be important and indicative of the subject matter of the input asset. The machine learning module 104 can exclude nonce words such as articles and other repetitive content that are not likely to be indicative of the subject matter included in the asset(s).

Other rules can be used that search for quotations or facts/statistics that are determined by looking for numerical characters in combination with certain words or phrases or even symbols. Using a sentence "45% of users experienced latency", the number 45 is located near a phrase "users experienced." Thus it can be inferred that the number in combination with phrase is relevant as a statistic. The presence of the % symbol also adds weight to this inference. Additional examples of content extracted from the example input asset are illustrated and described in greater detail with respect to FIGS. 3A-3E, each of which is disclosed infra.

Figure 3A:
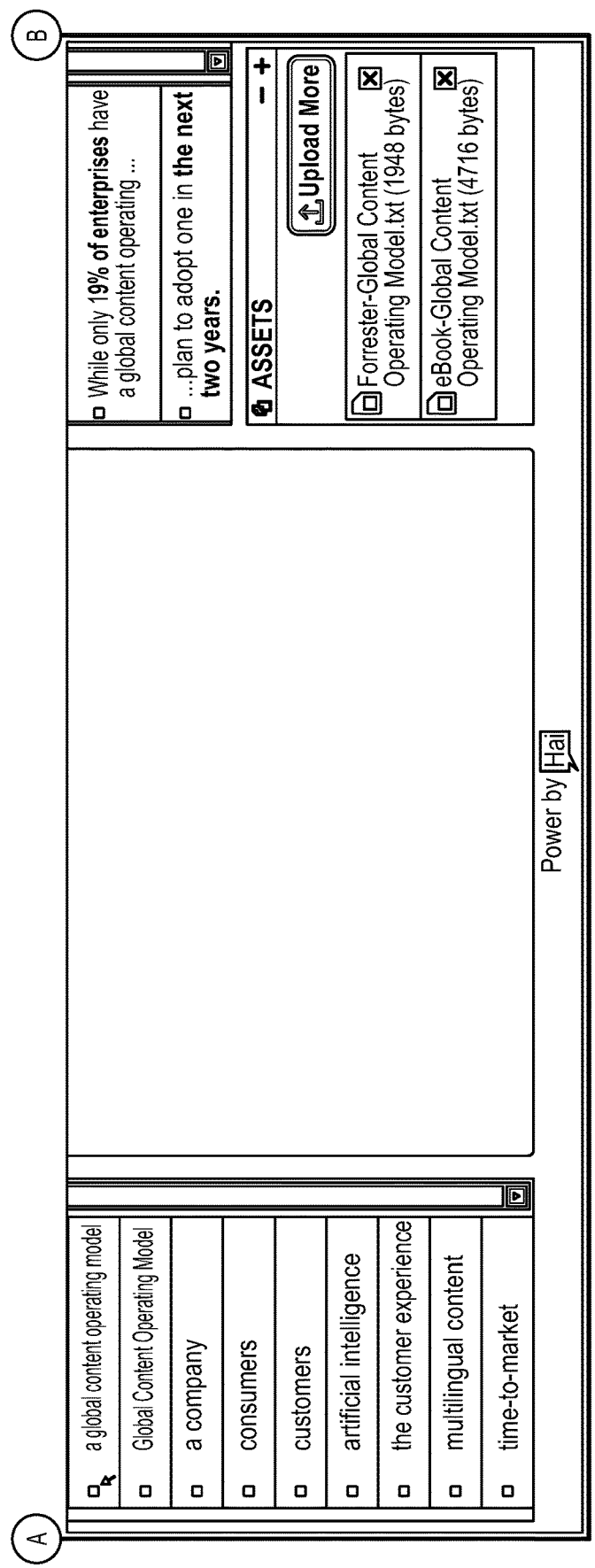
FIGS. 3A-3E collectively illustrate the use of a graphical user interface that displays various content extracted from input asset(s) and the automated (either partial or complete) authoring of messages based on the content extracted from input asset(s).

Once the various types of content have been extracted from the one or more assets, the graphical user interface module 106 is then executed to provide a copyrighting assistant interface (herein after GUI 300) as illustrated in FIG. 3A. Generally, the GUI 300 generally comprises various windows that include extracted content and/or mechanisms for selecting and otherwise interacting with said extracted content.

In one embodiment, the GUI 300 includes a first window 302, a second window 304, a third window 306, a fourth window 308, a fifth window 310, and a sixth window 312. Each of these windows and their corresponding extracted content are disclosed in greater detail below.

In general, relevant words and phrases are displayed in the first window 302 of the GUI 300 and other specific phrases such as quotes are displayed in the second window 304 of the GUI 300. In some embodiments, the keywords displayed in the first window 302 are extracted from the one or more input assets and are displayed according to a frequency of occurrence in the underlying assets. Thus, in the Global Content Operating Manual, the words "content" and "companies" are found more frequently than any other words. Instead of displaying the keywords and phrases in an ordered list, such content can be displayed as a word cloud, with more frequently occurring words/phrases being larger in font size or color. Each of the items listed in the first window 302 are selectable using, for example a check box 314. Moreover, based on machine learning, one or more of the items listed in the first window 302 can be associated with an icon. For example, a relevant word of "Forrester" that is indicative of a person's name is provided with a human icon. This name appears frequently in the input asset.

The quotes located in the second window 304 are also each associated with a selectable check box. These quotes include individual, stand-alone phrases that reflect valuable textual information included in the underlying assets. Often, these quotes comprise one or more of the keywords/phrases found in the first window 302. In some embodiments, the quotes included in the second window 304 are updated in real-time based on the selections of keywords/phrases in the first window 302.

In some embodiments, statistics are displayed in the third window 306. The statistics include content that is indicative of or associated with a numerical value, but the items listed in the third window 306 include additional characters in a string in which the numerical value is found. As noted above, the machine learning module 104 includes rules that identify words or phrases that are indicative of a statistic. Once found the graphical user interface module 106 can list strings of words, such as sentences or sub-sentence phrases that include the statistics. The relevant statistic of a sentence or sub-sentence phrase can be set off in bold. Moreover, each of the items in the list of third window 306 is selectable through a check box.

Various embodiments include the fourth window 308 that includes segments of content. As noted above, the content displayed in the various windows 302-306 is selectable by a user of the GUI 300. The segments of content displayed in the fourth window 308 are populated in response to the items selected from one or more of the windows 302-306. That is, the user can select which items from the various windows are of interest. Once selected, the system 100 (see FIG. 1) will populate the fourth window 308 with segments of content as illustrated in FIG. 3B, which will be described in greater detail below.

Generally, the GUI 300 also includes a smart channel editor 316 in the fifth window 310. The smart channel editor 316 is a mechanism configured to allow a user to compose a message (either in whole or in part) based on the content provided in the various windows of the GUI 300. Users can base the content of the message on segments of content displayed in the fourth window 308. In some instances, the message that is composed is created using the machine learning module 104.

Figure 3B:
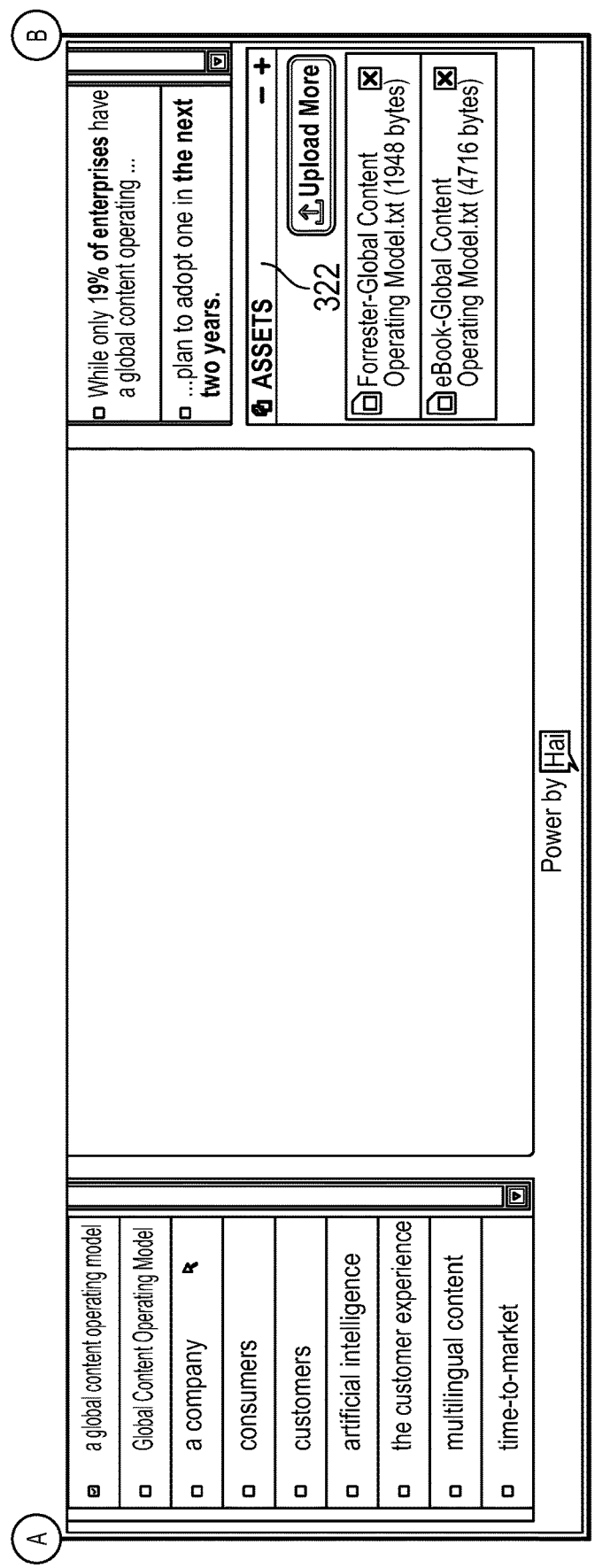

For example, in FIG. 3B, the phrase "a global content operating model" is selected by the user from the first window 302. This selection causes the system 100 (through cooperation of the machine learning module 104 and the graphical user interface module 106) to display segments of content 318 in the fourth window 308. The segments of content 318 include quotations of content extracted from the underlying input asset that correspond to the selection of the user. This action fine-tunes the most relevant content found in the underlying input asset that is of interest to the user. The segments of content 318 are listed in order of relevancy to the items selected by the user. That is, the machine learning module 104 can generate a relevancy score for each segment selected for the fourth window 308. In some embodiments, the relevancy score is represented as a series of dots placed by a segment. A segment having all five dots darkened is a highly relevant (high relevancy score) segment. Again, the relevancy score is related to how well content extracted from the input asset(s) matches the items selected by the user. For example, the segment of "A global content operating model can alleviate challenges and provide clear benefits" was found to be highly relevant to the select item of "a global content operating model" selected by the user from the first window 302.

In some embodiments, the content of the message is populated, in whole or in part, by the machine learning module 104 (see FIG. 1) of the system 100 based on the selections of the user. That is, once the user has selected items from any of the various windows, the machine learning module 104 can pre-populate the smart channel editor 316 with textual content from the segments of content 318. As a default setting, the machine learning module 104 can select the most relevant item in the segments of content 318 as an initial message. In some embodiments, rather than copying content verbatim from the segments of content 318, the machine learning module 104 can also apply natural language processing rules to convert content in a segment to a more linguistically appropriate format. For example, if the content in a segment is a fragment or run-on, the machine learning module 104 can utilize natural language processing rules to convert such content into a well-formed sentence. The machine learning module 104 could also use native knowledge regarding the site to which the message will be published in order to reformat the segment. For example, if the site to which a message is published is a social network with a character limit, the machine learning module 104 can truncate or reword a segment to comply with that character limit.

In sum, the machine learning module 104 is configured to automatically generate a message through use of a message creation ruleset. This message creation ruleset can define format, layout, style, linguistic, or other parameters of an automated message that define how relevant content from the input asset(s) are converted into a message.

The automation of message creation from more comprehensive input assets allows for rapid dissemination of the messages into social media or other platforms that benefit from rapid or frequent content sharing in order to drive customer or viewer engagement without the use of human input (or very limited human input). In some embodiments, the system 100 populates automatically generated messages to a queue for subsequent distribution (see FIG. 3E). Thus, a human may only be required to review AI generated messages in the queue before publishing. If messages are edited prior to publishing, the message can be processed by the machine learning module 104 in order to update the message creation ruleset in order to produce more suitable messages in the future. Thus, the machine learning module 104 learns from user feedback and edits in order to improve the future format or content of messages.

Also, part of the message creation ruleset used by the machine learning module 104 can include message scheduling which determines how often messages are created and disseminated by the system 100. This type of information can be determined through analysis of trends of competitors and other suitable information sources or corporate policies.

In some embodiments, the machine learning module 104 can not only generate segments of interest, but the machine learning module 104 can also create ancillary or collateral content for use in a message. These can also be based on native knowledge regarding the site to which the message will be published. For example, the machine learning module 104 can create hashtags 320 based on the relevant segments provided in the fourth window 308.

In some embodiments, the sixth window 312 of the GUI 300 comprises a summary of the input assets (user selected and/or third party content) that provide a user with a summary of the subject matter included in the input assets. This allows a user with limited domain knowledge to effectively create messages. This can also assist a user who is reviewing automatically generated AI messages produced by the system 100.

In various embodiments, the GUI 300 can also include a seventh window 322 that identifies the input assets used to generate the content included in the GUI 300. The user can remove or add input assets as desired through this seventh window 322.

Figure 3C:
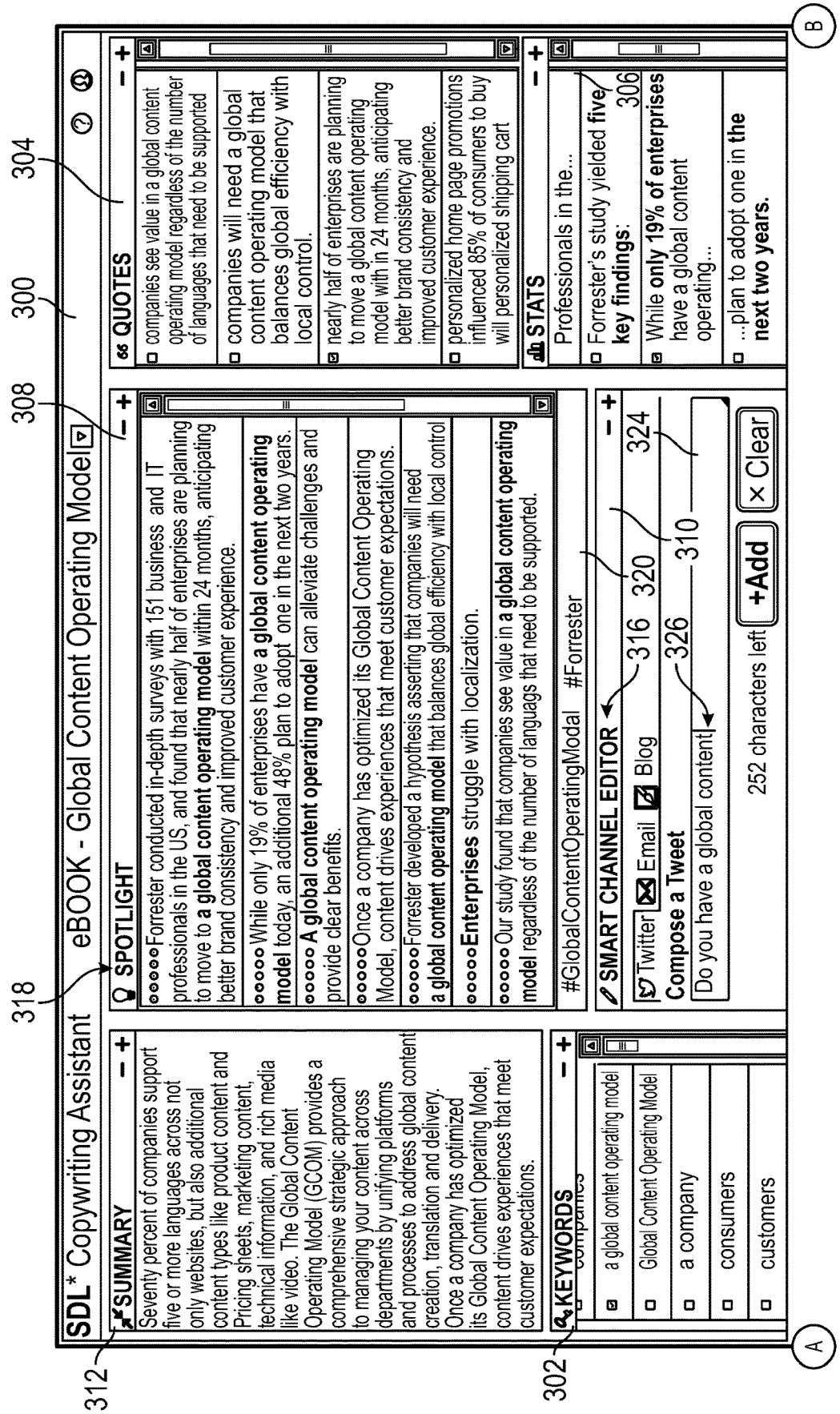
Figure 3C:
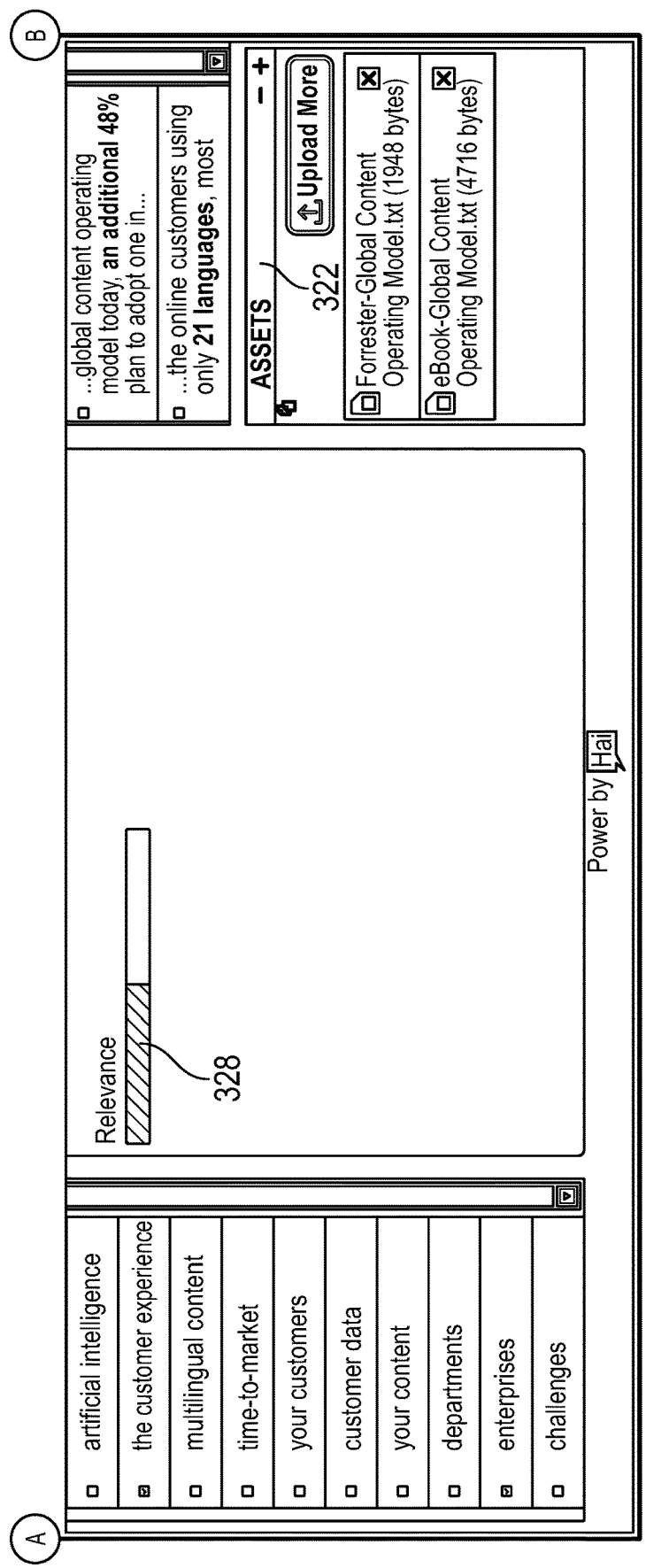
Figure 3D:
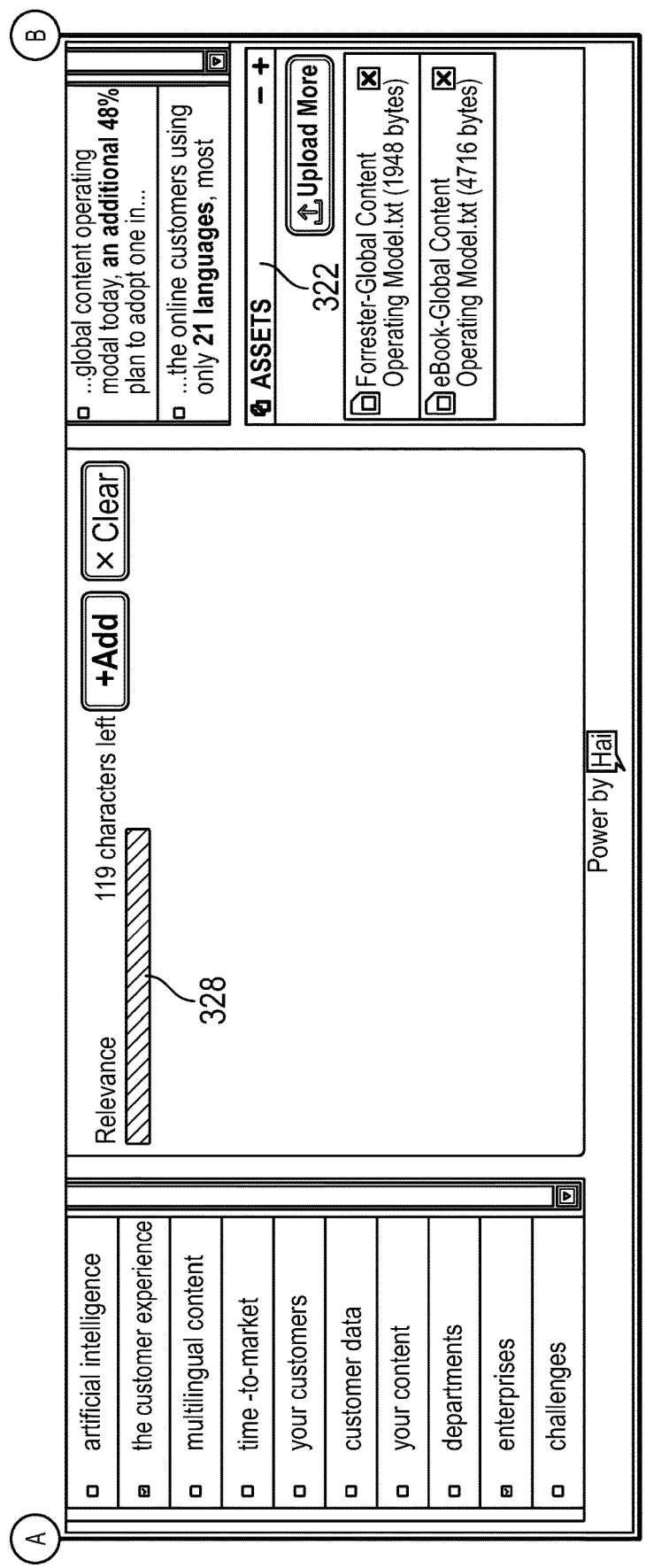
Figure 3E:
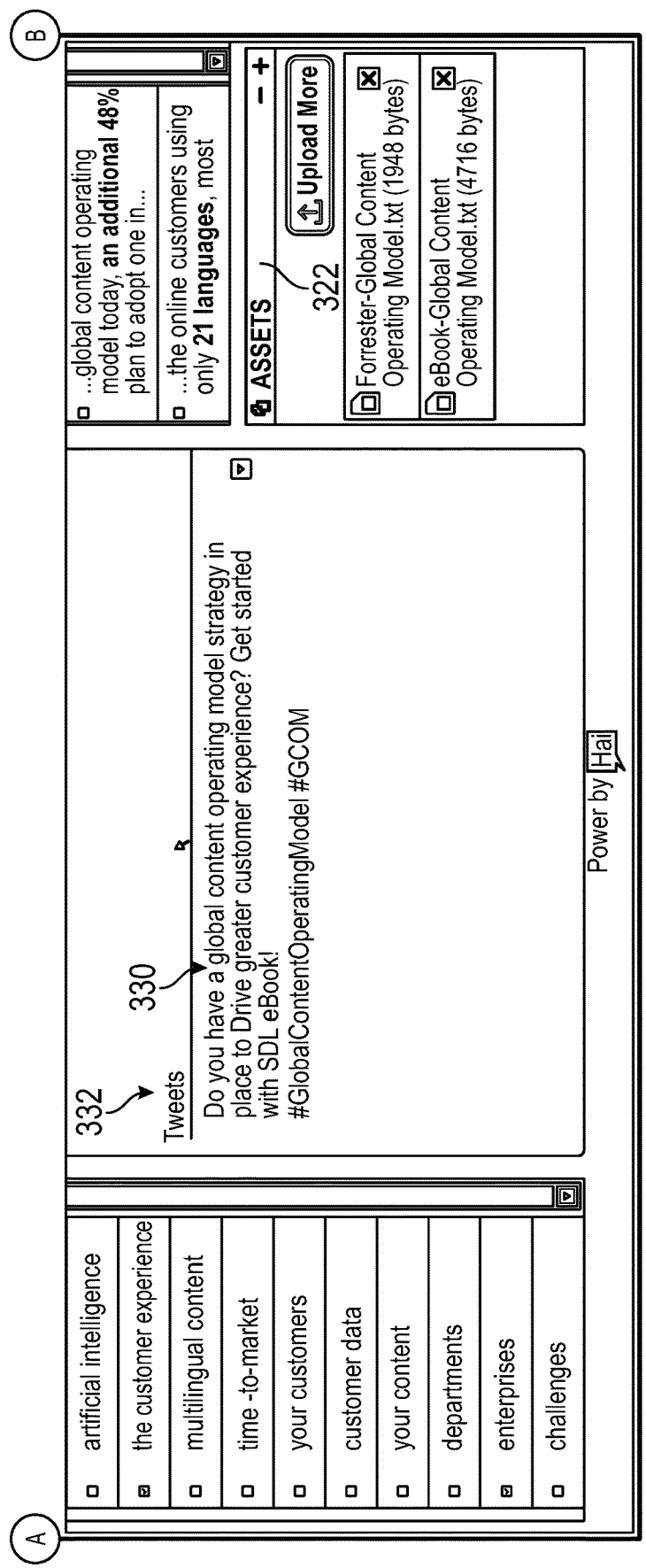

FIG. 3C illustrates the GUI 300 and specifically the use of the smart channel editor 316. The smart channel editor 316 includes a text input box 324 that can be filled with content either by the system 100 or by a user. For example, the text input box 324 can be filled with message content 326. As the text input box 324 box is filled with message content, the system 100 (and specifically the machine learning module 104) generates a real-time relevancy score that indicates how relevant the message content is relative to the items selected by the user from the various windows of the GUI 300 (note that the items selected in FIG. 3C vary from those selected in FIGS. 3A-3B). FIG. 3C illustrates the message content as it is being created with a relatively mid-range relevancy score as notated or illustrated by way of a relevancy progress bar 328. This is in contrast with the completed message content 330 illustrated in FIG. 3D. As noted above, the completed message content 330 illustrated in FIG. 3D includes an AI generated hashtag 320. This completed message content 330 is added to a queue 332 as illustrated in FIG. 3E.

Figure 4:
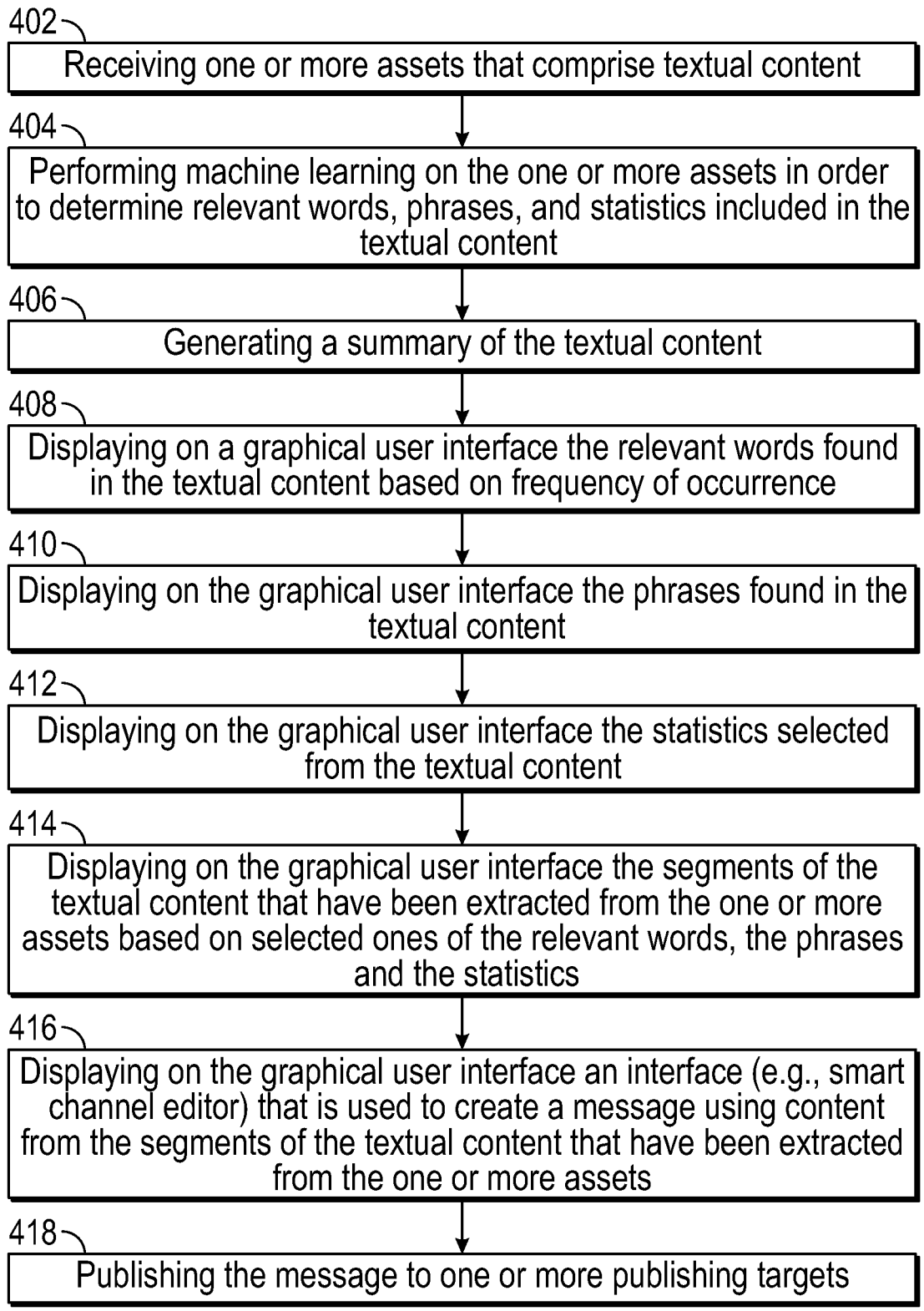
FIG. 4 is a flowchart of an example method of the present disclosure.

FIG. 4 is a flowchart of an example method of the present disclosure. The method includes a step 402 of receiving one or more assets that comprise textual content. Again, this can include assets identified by a user and/or assets obtained from a third party resource as well. Next, the method includes a step 404 of performing machine learning on the one or more assets in order to determine relevant words, phrases, and statistics included in the textual content. The method can also include a step 406 of generating a summary of the textual content.

In various embodiments, the method can include a step 408 of displaying on a graphical user interface the relevant words found in the textual content based on frequency of occurrence. To be sure each of the relevant words is selectable by the user. Next, the method includes a step 410 of displaying on the graphical user interface the phrases found in the textual content. Again, each of the phrases is selectable. The phrases can include quotes in some embodiments.

In one or more embodiments, the method includes a step 412 of displaying on the graphical user interface the statistics selected from the textual content. The statistics can be displayed in the context of the sentence or word string in which they appear in the textual content.

The method includes a step 414 of displaying on the graphical user interface the segments of the textual content that have been extracted from the one or more assets based on selected ones of the relevant words, the phrases and the statistics.

As noted above, the method can also include a step 416 of displaying on the graphical user interface an interface (e.g., smart channel editor) that is used to create a message using content from the segments of the textual content that have been extracted from the one or more assets. To be sure, the message content created in the smart channel editor includes either AI or user generated messages. In one or more embodiments, the method can also include a step 418 of publishing the message to one or more publishing targets.

Figure 5:
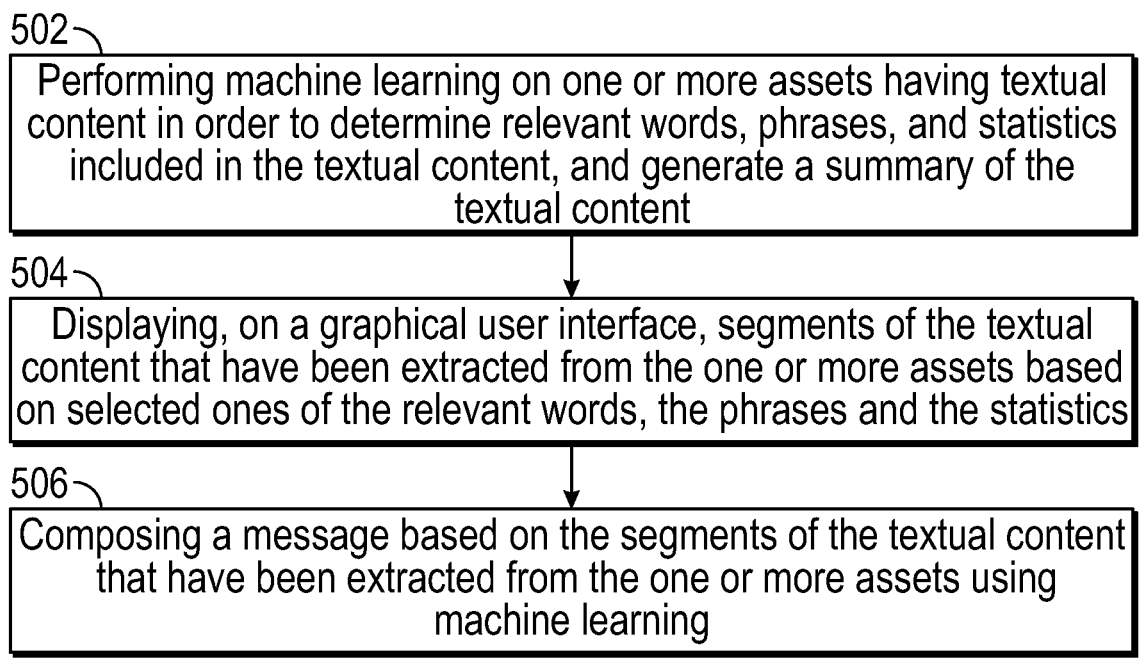
FIG. 5 is a flowchart of another example method of the present disclosure.

FIG. 5 is a flowchart of another example method of the present disclosure. The method generally includes a step 502 of performing machine learning on one or more assets having textual content in order to determine relevant words, phrases, and statistics included in the textual content, and generate a summary of the textual content. The method also includes a step 504 of displaying, on a graphical user interface, segments of the textual content that have been extracted from the one or more assets based on selected ones of the relevant words, the phrases and the statistics.

The method further includes a step of 506 composing a message based on the segments of the textual content that have been extracted from the one or more assets using machine learning. In some embodiments an interface is presented that (e.g., smart channel editor) is used to create or edit an AI generated message prior to publishing.

Figure 6:
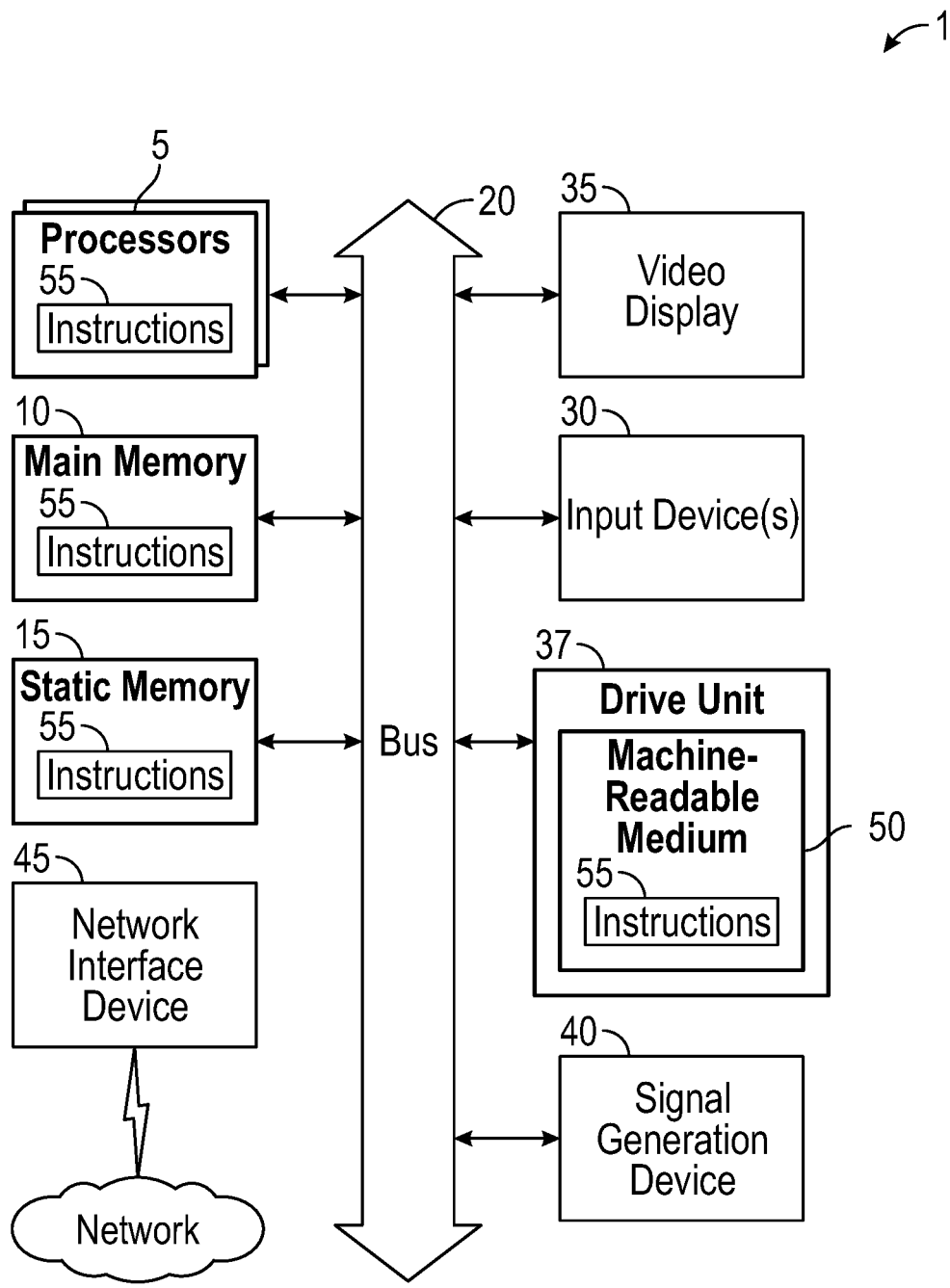
FIG. 6 is a schematic diagram of an example computing system that may be used to implement embodiments disclosed in accordance with the present disclosure.

FIG. 6 illustrates an example computer system 1 that can be utilized for machine learning for digital assets and message creation. That is, the computer system 1 can implement the AI/machine learning of the present disclosure.

The computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its nonitalicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technology in the form disclosed. Many modifications and variations will be apparent to those of ordinary skill in the art without departing from the scope and spirit of the technology. Exemplary embodiments were chosen and described in order to best explain the principles of the present disclosure and its practical application, and to enable others of ordinary skill in the art to understand the technology for various embodiments with various modifications as are suited to the particular use contemplated.

Aspects of the present disclosure are described above with reference to flowchart illustrations and/or block diagrams of methods, apparatus (systems) and computer program products according to embodiments of the technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the technology. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

While the present disclosure has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method, comprising:
receiving one or more assets that comprise textual content;
performing machine learning on the one or more assets in order to determine relevant words, phrases, and statistics included in the textual content, and generating a summary of the textual content, the summary comprising a textual narrative created from the relevant words, the phrases, and the statistics;
receiving feedback from an editor with respect to the summary;
incorporating the feedback into the machine learning;
automatically generating a message using the machine learning through use of a message creation ruleset; and
displaying on a graphical user interface:
the relevant words based on frequency of occurrence in the one or more assets, each of the relevant words being selectable;
the phrases, each of the phrases being selectable;
the statistics, each of the statistics being selectable;
segments of the textual content that have been extracted from the one or more assets based on selected ones of the relevant words, the phrases and the statistics; and
an interface that is used to create the message using content from the segments of the textual content that have been extracted from the one or more assets, wherein the machine learning applies natural language processing rules to convert a run-on or a fragment, in at least one of the segments of the textual content, into a sentence, and further wherein the feedback is incorporated by the machine learning to improve a future format or content of future summaries and based on the feedback, the message is further processed by the machine learning to update the message creation ruleset.

2. The method according to claim 1, wherein the relevant words are displayed in a first window of the graphical user interface and the phrases are displayed in a second window of the graphical user interface.

3. The method according to claim 2, wherein the statistics are displayed in a third window, the segments are displayed in a fourth window, and the interface is displayed in a fifth window.

4. The method according to claim 3, wherein the graphical user interface further comprises a sixth window that comprises the summary of the textual content.

5. The method according to claim 4, wherein the machine learning is configured to generate relevancy scores for each of the segments based on the selected ones of the relevant words, the phrases and the statistics.

6. The method according to claim 5, wherein the machine learning is configured to generate hashtags from the relevant words, the hashtags being displayed in the fourth window, further wherein the hashtags are incorporated into a message in the interface when selected from the fourth window.

7. The method according to claim 6, further comprising adding the message to a queue for distribution.

8. The method according to claim 1, further comprising:
utilizing an application programming interface to search social networks for third party content that matched to the one or more assets; and
incorporating the third party content with the one or more assets during the machine learning such that the relevant words, the phrases, and the statistics are based on both the one or more assets and the third party content.

9. The method of claim 1, further comprising generating a real-time relevancy score that indicates how relevant the content of the message is relative to a user's selections made through the graphical user interface.

10. The method of claim 1, wherein the machine learning further creates ancillary or collateral content for use in the message.

11. A system, comprising:
an asset analyzer module configured to receive one or more assets that comprise textual content;
a machine learning module configured to:
perform machine learning on the one or more assets in order to determine relevant words, phrases, and statistics included in the textual content, and generate a summary of the textual content, the summary comprising a textual narrative created from the relevant words, the phrases, and the statistics;
receive feedback from an editor with respect to the summary;
incorporate the feedback into the machine learning; and
automatically generate a message using the machine learning through use of a message creation ruleset; and
a graphical user interface module configured to display on a graphical user interface:
the relevant words based on frequency of occurrence in the one or more assets, each of the relevant words being selectable;
the phrases, each of the phrases being selectable;
the statistics, each of the statistics being selectable;
segments of the textual content that have been extracted from the one or more assets based on selected ones of the relevant words, the phrases and the statistics; and
an interface that is used to create the message using content from the segments of the textual content that have been extracted from the one or more assets, wherein the machine learning applies natural language processing rules to convert a run-on or a fragment, in at least one of the segments of the textual content, into a sentence, and further wherein the feedback is incorporated by the machine learning to improve a future format or content of future summaries and based on the feedback, the message is further processed by the machine learning to update the message creation ruleset.

12. The system according to claim 11, wherein the relevant words are displayed in a first window of the graphical user interface and the phrases are displayed in a second window of the graphical user interface.

13. The system according to claim 12, wherein the statistics are displayed in a third window, the segments are displayed in a fourth window, and the interface is displayed in a fifth window.

14. The system according to claim 13, wherein the graphical user interface further comprises a sixth window that comprises the summary of the textual content.

15. The system according to claim 14, wherein the machine learning module is further configured to generate relevancy scores for each of the segments based on the selected ones of the relevant words, the phrases and the statistics.

16. The system according to claim 15, wherein the machine learning module is further configured to generate hashtags from the relevant words, the hashtags being displayed in the fourth window, further wherein the hashtags are incorporated into a message in the interface when selected from the fourth window.

17. The system according to claim 16, wherein the graphical user interface module is further configured to add the message to a queue for distribution.

18. The system according to claim 17, wherein the asset analyzer module is further configured to:
utilize an application programming interface to search social networks for third party content that matched to the one or more assets; and
incorporate the third party content with the one or more assets during the machine learning such that the relevant words, the phrases, and the statistics are based on both the one or more assets and the third party content.

19. The system according to claim 18, wherein the machine learning module further utilizes native knowledge regarding a site to which the message will be published in order to reformat a segment of textual content.

20. A method, comprising:
performing machine learning on one or more assets having textual content in order to determine relevant words, phrases, and statistics included in the textual content, and generate a summary of the textual content, the summary comprising a textual narrative created from the relevant words, the phrases, and the statistics;
displaying, on a graphical user interface, segments of the textual content that have been extracted from the one or more assets based on selected ones of the relevant words, the phrases and the statistics, and an interface that is used to create a message using content from the segments of the textual content that have been extracted from the one or more assets;
receiving feedback from an editor with respect to the summary;
incorporating the feedback into the machine learning to improve a future format or content of future messages;
automatically generating the message using the machine learning through use of a message creation ruleset;
applying natural language processing rules by the machine learning to convert a run-on or a fragment, in at least one of the segments of the textual content, into a sentence; and based on the feedback, processing the message, using the machine learning, to update the message creation ruleset for the future messages.

21. The method of claim 20, further comprising reformatting a segment by the machine learning utilizing native knowledge regarding a site to which the message will be published.

\* \* \* \* \*

UNITED STATES PATENT AND TRADEMARK OFFICE
CERTIFICATE OF CORRECTION

PATENT NO. : 11,256,867 B2  
APPLICATION NO. : 16/155658  
DATED : February 22, 2022  
INVENTOR(S) : Echihabi et al.

Page 1 of 1

It is certified that error appears in the above-identified patent and that said Letters Patent is hereby corrected as shown below:

In the Claims

Column 13 Lines 47-50, that portion reading:
automatically generate a message using the machine
    learning through use of a message creation ruleset; and
    a graphical user interface module configured to display
        on a graphical user interface:

Should read:
"automatically generate a message using the machine
    learning through use of a message creation ruleset; and
a graphical user interface module configured to display
    on a graphical user interface:"

Signed and Sealed this  
Tenth Day of May, 2022

Katherine Kelly Vidal  
*Director of the United States Patent and Trademark Office*